US012562915B2

(12) United States Patent
Li

(10) Patent No.: US 12,562,915 B2
(45) Date of Patent: Feb. 24, 2026

(54) AUTHENTICATION METHOD AND COMMUNICATION APPARATUS

(71) Applicant: HUAWEI TECHNOLOGIES CO., LTD., Guangdong (CN)

(72) Inventor: Fei Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 299 days.

(21) Appl. No.: 18/356,420

(22) Filed: Jul. 21, 2023

(65) Prior Publication Data

US 2023/0370277 A1 Nov. 16, 2023

Related U.S. Application Data

(63) Continuation of application No. PCT/CN2022/071670, filed on Jan. 12, 2022.

(30) Foreign Application Priority Data

Jan. 22, 2021 (CN) .......................... 202110090637.4

(51) Int. Cl.
*H04L 9/32* (2006.01)
*H04W 60/04* (2009.01)

(52) U.S. Cl.
CPC .......... *H04L 9/3239* (2013.01); *H04L 9/3271* (2013.01); *H04W 60/04* (2013.01); *H04L 2209/80* (2013.01)

(58) Field of Classification Search
CPC .................................................... H04L 9/3239
See application file for complete search history.

(56) References Cited

U.S. PATENT DOCUMENTS 10,581,611 B1* 3/2020 Osborn ............... H04W 12/041
2017/0272944 A1* 9/2017 Link, II ................ H04L 9/0841
(Continued)

FOREIGN PATENT DOCUMENTS

CN 1913437 A 2/2007
CN 101132279 A 2/2008
(Continued)

OTHER PUBLICATIONS

China Mobile et al., "Proposed text to the "Session setup efficiency" for TR 23.8bc (Feasibility Study on IMS Evolution)," 3GPP TSG SA WG2 Meeting #68, S2-086999, Qing Dao, China, Oct. 13-17, 2008, 5 pages.
(Continued)

*Primary Examiner* — Simon P Kanaan

(74) *Attorney, Agent, or Firm* — Fish & Richardson P.C.

(57) ABSTRACT

Authentication methods and communication apparatuses are provided. In an implementation, an authentication method includes: receiving an authentication vector request message
(Continued)

from a serving call session control function network element, calculating a first hash value of a security parameter based on a first security algorithm, calculating a second hash value of the security parameter based on a second security algorithm, and sending an authentication vector request response to the serving call session control function network element, wherein the authentication vector request response comprises the first hash value and the second hash value.

16 Claims, 11 Drawing Sheets

(56) References Cited

U.S. PATENT DOCUMENTS

| | | | |
|---|---|---|---|
| 2017/0272945 A1* | 9/2017 | Link, II | H04W 12/041 |
| 2017/0339115 A1* | 11/2017 | Cho | H04W 12/062 |
| 2019/0245006 A1 | 8/2019 | Tsai et al. | |
| 2019/0260730 A1 | 8/2019 | Mainali | |
| 2022/0014918 A1* | 1/2022 | Mastenbrook | G06F 21/64 |

FOREIGN PATENT DOCUMENTS

| | | |
|---|---|---|
| CN | 103905405 A | 7/2014 |
| CN | 110324291 A | 10/2019 |
| EP | 1755311 A1 | 2/2007 |
| JP | 2009543453 A | 12/2009 |
| JP | 2012531792 A | 12/2012 |
| JP | 2018516403 A | 6/2018 |
| WO | 2007022800 A1 | 3/2007 |

OTHER PUBLICATIONS

3GPP TS 33.203 V16.1.0, "3rd Generation Partnership Project, Technical Specification Group Services and System Aspects; 3G security; Access securiy for IP-based services (Release 16)," Sep. 2020, 146 pages.

Huawei et al., "IMS SCAS: new test case on high-priority algorithm selection in the P-CSCF," 3GPP TSG-SA3 Meeting #100e, e-meeting, S3-201856, Aug. 17-28, 2020, 2 pages.

Huawei et al., "user id clarification for scenario of using Web id direct registration in IMS," 3GPP TSG-SA WG3 (Security) Meeting #75, S3-140823, Sapporo, Japan, May 12-16, 2014, 3 pages.

Ofice Action in Japanese Appln. No. 2023-544403, mailed on Aug. 13, 2024, 9 pages (with English translation).

Office Action in Australian Appin. No. 2022210153, mailed on Oct. 25, 2024, 3 pages.

3GPP SA3, "LS on key derivation for IMS-based application services," 3GPP TSG SA WG3 Security-S3#27, S3-030147, Feb. 25-28, 2003, Sophia Antipolis, France, 61 pages.

Extended European Search Report in European Appln No. 22742059.3, dated Jun. 25, 2024, 10 pages.

* cited by examiner

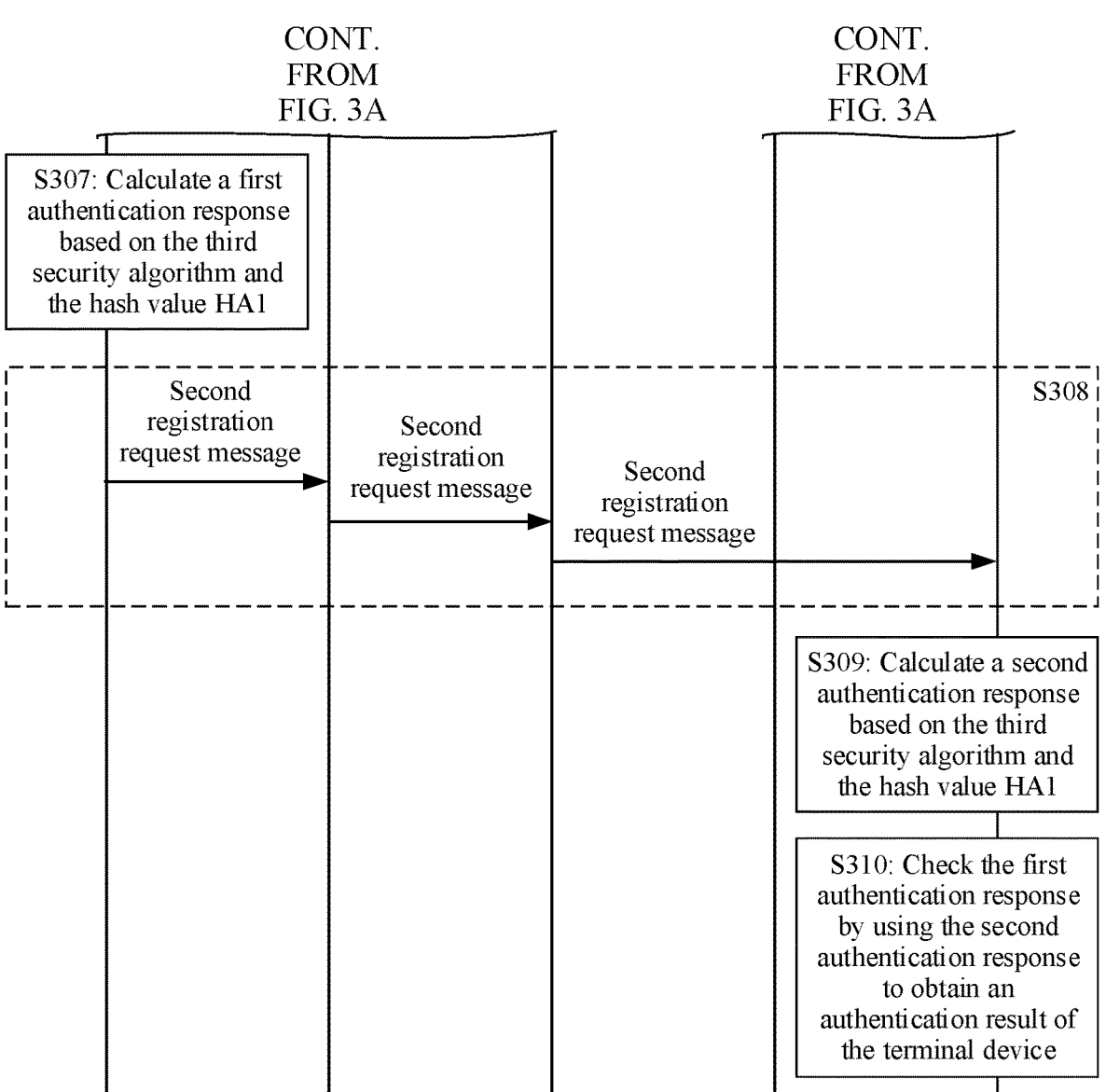

CONT.
FROM
FIG. 3A

CONT.
FROM
FIG. 3A

S307: Calculate a first authentication response based on the third security algorithm and the hash value HA1

Second registration request message

Second registration request message

Second registration request message

S308

S309: Calculate a second authentication response based on the third security algorithm and the hash value HA1

S310: Check the first authentication response by using the second authentication response to obtain an authentication result of the terminal device

AUTHENTICATION METHOD AND COMMUNICATION APPARATUS

CROSS-REFERENCE TO RELATED APPLICATIONS

This application is a continuation of International Application No. PCT/CN2022/071670, filed on Jan. 12, 2022, which claims priority to Chinese Patent Application No. 202110090637.4, filed on Jan. 22, 2021. The disclosures of the aforementioned applications are hereby incorporated by reference in their entireties.

TECHNICAL FIELD

This application relates to the field of communication technologies, and in particular, to an authentication method and a communication apparatus.

BACKGROUND

Currently, an internet protocol multimedia subsystem (internet protocol multimedia subsystem, IMS) usually authenticates a terminal device in a session initiation protocol (session initiation protocol, SIP) digest (digest) authentication mode. A serving call session control function (serving call session control function, S-CSCF) network element indicates, to the terminal device, that a security algorithm is a message digest 5 (message digest 5, MD5) algorithm. The terminal device performs calculation by using the MD5 algorithm to obtain an authentication response. Then, the terminal device sends the authentication response to the S-CSCF network element, so that the S-CSCF network element authenticates the terminal device based on the authentication response. Because the MD5 algorithm is an insecure algorithm, one solution is to enable some terminal devices to support a new security algorithm such as a secure hash algorithm (secure hash algorithm, SHA) 256 or a SHA512, and complete authentication through an authentication response calculated by using the SHA256 or the SHA512.

It is clear that this solution results in the following situation: Because some terminal devices support the SHA256 or the SHA512, the some terminal devices need to use the SHA256 or the SHA512 to calculate the authentication response; and other terminal devices do not support the SHA256 or the SHA512, and still use the MD5 algorithm to calculate the authentication response. In this case, how to enable terminal devices that support different security algorithms to complete authentication is an urgent problem to be resolved.

SUMMARY

Embodiments of this application provide an authentication method and a communication apparatus, to authenticate terminal devices that support different security algorithms.

According to a first aspect, an embodiment of this application provides an authentication method. The method may be performed by a terminal device, or may be a chip applied to the terminal device. The following provides descriptions by using an example in which the method is performed by the terminal device. The method includes: The terminal device sends a first registration request message to a serving call session control function network element. The first registration request message carries information about security algorithms that can be supported by the terminal device, and the security algorithms include at least one of the following: a first security algorithm or a second security algorithm. The terminal device receives an authentication challenge message from the serving call session control function network element. The authentication challenge message includes information about a third security algorithm, and the third security algorithm is one of the security algorithms that can be supported by the terminal device. The terminal device calculates a hash value of a security parameter based on the third security algorithm, the terminal device calculates an authentication response based on the third security algorithm and the hash value, and the terminal device sends a second registration request message to the serving call session control function network element. The second registration request message carries the authentication response, and the authentication response is used to authenticate the terminal device.

In this way, for a terminal device that supports a new security algorithm (for example, the first security algorithm and/or the second security algorithm), the terminal device adds information about the security algorithm to the first registration request message, to indicate, to the serving call session control function network element, the security algorithm that can be supported by the terminal device, so that the terminal device and the serving call session control function network element calculate the authentication response based on a same security algorithm. Therefore, the terminal device that supports the "first security algorithm and/or the second security algorithm" can be authenticated. In addition, for a terminal device that does not support the new security algorithm (for example, the first security algorithm and/or the second security algorithm), the terminal device does not need to add information about the security algorithm to the first registration request message. In this case, the serving call session control function network element may determine that the security algorithm is an MD5 algorithm, and then calculate the authentication response by using the MD5 algorithm, to authenticate the terminal device that does not support the new security algorithm (for example, the first security algorithm and/or the second security algorithm).

In a possible design, the first security algorithm is a secure hash algorithm SHA256, and the second security algorithm is a secure hash algorithm SHA512. The SHA256 and the SHA512 are new security algorithms. Therefore, when the SHA256 or the SHA512 is used to authenticate the terminal device, security performance of an authentication process is improved.

According to a second aspect, an embodiment of this application provides an authentication method. The method may be performed by a serving call session control function network element, or may be a chip applied to the serving call session control function network element. The following provides descriptions by using an example in which the method is performed by the serving call session control function network element. The method includes: The serving call session control function network element receives a first registration request message from a terminal device. The first registration request message includes information about security algorithms that can be supported by the terminal device, and the security algorithms include at least one of the following: a first security algorithm or a second security algorithm. The serving call session control function network element sends an authentication vector request message to a home subscriber server. The authentication vector request message includes the information about the security algorithms that can be supported by the terminal device. The serving call session control function network element receives an authentication vector request response returned by the home subscriber server. The authentication vector request response includes a hash value and information about a third security algorithm, the hash value is obtained through calculation based on the third security algorithm, and the third security algorithm is one of the security algorithms that can be supported by the terminal device. The serving call session control function network element sends an authentication challenge message to the terminal device. The authentication challenge message includes the information about the third security algorithm. The serving call session control function network element receives a second registration request message from the terminal device. The second registration request message carries a first authentication response. The serving call session control function network element calculates the second authentication response based on the third security algorithm and the hash value. The serving call session control function network element checks the first authentication response by using the second authentication response, to obtain an authentication result of the terminal device.

In this way, for a terminal device that supports a new security algorithm (for example, the first security algorithm and/or the second security algorithm), the serving call session control function network element can learn, by using the first registration request message, the security algorithm supported by the terminal device. Then, the serving call session control function network element provides information about the security algorithm supported by the terminal device to the home subscriber server, to obtain, from the home subscriber server, the information about the third security algorithm and the hash value calculated by using the third security algorithm. Then, the serving call session control function network element determines a second authentication response based on information in the authentication vector request response, so that the serving call session control function network element checks the first authentication response by using the second authentication response, to authenticate the terminal device that supports the "first security algorithm and/or the second security algorithm". In addition, for a terminal device that does not support the new security algorithm (for example, the first security algorithm and/or the second security algorithm), the terminal device does not need to add information about the security algorithm to the first registration request message. In this case, the serving call session control function network element may determine that the security algorithm is an MD5 algorithm, and calculate the authentication response by using the MD5 algorithm, to authenticate the terminal device that does not support the new security algorithm (for example, the first security algorithm and/or the second security algorithm).

In a possible design, the first security algorithm is a secure hash algorithm SHA256, and the second security algorithm is a secure hash algorithm SHA512.

According to a third aspect, an embodiment of this application provides an authentication method. The method may be performed by a home subscriber server, or may be a chip applied to the home subscriber server. The following provides descriptions by using an example in which the method is performed by the home subscriber server. The method includes: The home subscriber server receives an authentication vector request message from a serving call session control function network element. The authentication vector request message includes information about security algorithms that can be supported by the terminal device, and the security algorithms include at least one of the following: a first security algorithm or a second security algorithm. The home subscriber server calculates a hash value of a security parameter based on a third security algorithm, where the third security algorithm is one of the security algorithms that can be supported by the terminal device. The home subscriber server returns an authentication vector request response to the serving call session control function network element, where the authentication vector request response carries the hash value and information about the third security algorithm.

That is, the home subscriber server learns, by using the authentication vector request message, the security algorithms supported by the terminal device, then the home subscriber server determines, from the security algorithms supported by the terminal device, a security algorithm as the third security algorithm, and the home subscriber server provides, to the serving call session control function network element by using the authentication vector request response, the information about the third security algorithm and the hash value calculated by using the third security algorithm, so that the serving call session control function network element calculates a second authentication response. Therefore, the terminal device that supports the "first security algorithm and/or the second security algorithm" can be authenticated. In addition, for a terminal device that does not support a new security algorithm (for example, the first security algorithm and/or the second security algorithm), the authentication vector request message does not carry information about the security algorithm supported by the terminal device, and the home subscriber server still provides the serving call session control function network element with the hash value calculated by using the MD5 algorithm, so that the serving call session control function network element calculates the authentication response by using the MD5 algorithm, to authenticate the terminal device that does not support the new security algorithm (for example, the first security algorithm and/or the second security algorithm).

In a possible design, the first security algorithm is a secure hash algorithm SHA256, and the second security algorithm is a secure hash algorithm SHA512.

According to a fourth aspect, an embodiment of this application provides an authentication method. The method may be performed by a home subscriber server, or may be a chip applied to the home subscriber server. The following provides descriptions by using an example in which the method is performed by the home subscriber server. The method includes: The home subscriber server receives an authentication vector request message from a serving call session control function network element; the home subscriber server calculates a first hash value of a security parameter based on a first security algorithm; and the home subscriber server calculates a second hash value of the security parameter based on a second security algorithm. The home subscriber server returns an authentication vector request response to the serving call session control function network element. The authentication vector request response carries the first hash value and the second hash value.

That is, the home subscriber server calculates hash values of at least two security algorithms, for example, the first hash value calculated by the home subscriber server by using the first security algorithm and the second hash value calculated by using the second security algorithm. Then, after the home subscriber server provides the hash values determined for the security algorithms to the serving call session control function network element by using the authentication vector request response, so that the serving call session control function network element learns the security algorithms supported by the terminal device, then selects a hash value from a plurality of hash values provided in the authentication vector request response, and calculates a second authentication response. Therefore, the terminal device can be authenticated.

In a possible design, the authentication vector request response includes the first hash value and the second hash value that are carried in a preset order, and the preset order is determined based on a priority of the first security algorithm and a priority of the second security algorithm, so that the serving call session control function network element can distinguish between the first hash value and the second hash value based on the preset order.

In a possible design, the authentication vector request response further carries information about the first security algorithm and information about the second security algorithm. There is a correspondence between the information about the first security algorithm and the first hash value, and there is a correspondence between the information about the second security algorithm and the second hash value, so that the serving call session control function network element can distinguish between the first hash value and the second hash value based on correspondences.

In a possible design, the first security algorithm is a secure hash algorithm SHA256 or a SHA512, and the second security algorithm is a message digest MD5 algorithm. In other words, regardless of which security algorithm of the SHA256, the SHA512, or the MD5 algorithm is supported by the terminal device, the authentication method in this embodiment of this application can be used to authenticate the terminal device.

In a possible design, the first security algorithm is a SHA256, and the second security algorithm is a SHA512.

In a possible design, the authentication method in this embodiment of this application further includes: The home subscriber server calculates a third hash value of the security parameter based on a fourth security algorithm. The authentication vector request response further carries the third hash value. The fourth security algorithm is an MD5 algorithm.

That is, when the first security algorithm is the SHA256, and the second security algorithm is the SHA512, the home subscriber server further calculates the third hash value of the security parameter by using the fourth security algorithm, to provide the serving call session control function network element with a hash value calculated by using the fourth security algorithm. Regardless of which security algorithm of the first security algorithm, the second security algorithm, and the fourth security algorithm is supported by the terminal device, the terminal device and the serving call session control function network element can calculate the authentication response based on a same security algorithm (that is, the third security algorithm), to authenticate the terminal device.

According to a fifth aspect, an embodiment of this application provides an authentication method. The method may be performed by a serving call session control function network element, or may be a chip applied to the serving call session control function network element. The following provides descriptions by using an example in which the method is performed by the serving call session control function network element. The method includes: The serving call session control function network element receives a first registration request message from a terminal device. The serving call session control function network element sends an authentication vector request message to a home subscriber server. The serving call session control function network element receives an authentication vector request response returned by the home subscriber server. The authentication vector request response carries a first hash value and a second hash value, the first hash value is calculated based on a first security algorithm, and the second hash value is calculated based on a second security algorithm. The serving call session control function network element sends an authentication challenge request message to the terminal device. The authentication challenge request message carries information about the first security algorithm and information about the second security algorithm. The serving call session control function network element receives a second registration request message from the terminal device. The second registration request message includes a first authentication response and information about a third security algorithm, the first authentication response is calculated based on the third security algorithm, and the third security algorithm is the first security algorithm or the second security algorithm. The serving call session control function network element selects, from the first hash value and the second hash value, a hash value corresponding to the third security algorithm. The serving call session control function network element calculates a second authentication response based on the third security algorithm and the hash value corresponding to the third security algorithm. The serving call session control function network element checks the first authentication response by using the second authentication response, to obtain an authentication result of the terminal device.

In other words, the serving call session control function network element can obtain, from the home subscriber server by using the authentication vector request response, hash values calculated by using at least two security algorithms, for example, the first hash value calculated by using the first security algorithm and the second hash value calculated by using the second security algorithm. Then, the serving call session control function network element adds the information about the first security algorithm and the information about the second security algorithm to the authentication challenge request message, so that the terminal device can determine a security algorithm (that is, the third security algorithm) from security algorithms in the authentication challenge request message. The serving call session control function network element learns, by using the second registration request message, a security algorithm supported by the terminal device, that is, the third security algorithm, then determines, from the hash values provided in the authentication vector request response by using the third security algorithm, the hash value corresponding to the third security algorithm, and calculates the second authentication response based on the third security algorithm and the hash value corresponding to the third security algorithm, to authenticate the terminal device. For the serving call session control function network element, the serving call session control function network element does not need to identify whether the terminal device supports a new security algorithm (such as a SHA256 and/or a SHA512). Therefore, a processing process is simplified.

In a possible design, the authentication vector request response includes the first hash value and the second hash value that are carried in a preset order, and the preset order is determined based on a priority of the first security algorithm and a priority of the second security algorithm. That the serving call session control function network element selects from the first hash value and the second hash value, a hash value corresponding to the third security algorithm includes: The serving call session control function network element selects from the first hash value and the second hash value based on a preset order, the hash value corresponding to the third security algorithm.

In other words, the serving call session control function network element can determine, based on the preset order and from a plurality of hash values provided in the authentication vector request response, the hash value corresponding to the third security algorithm, to calculate the second authentication response based on the hash value corresponding to the third security algorithm.

In a possible design, the authentication vector request response further carries the information about the first security algorithm and the information about the second security algorithm, where there is a correspondence between the information about the first security algorithm and the first hash value, and there is a correspondence between the information about the second security algorithm and the second hash value. That the serving call session control function network element selects, from the first hash value and the second hash value, a hash value corresponding to the third security algorithm includes: The serving call session control function network element selects, from the first hash value and the second hash value, the hash value corresponding to the third security algorithm based on correspondences.

In other words, the serving call session control function network element can determine, from a plurality of hash values provided in the authentication vector request response based on the foregoing correspondences, the hash value corresponding to the third security algorithm, to calculate the second authentication response based on the hash value corresponding to the third security algorithm.

In a possible design, the authentication challenge request message includes the information about the first security algorithm and the information about the second security algorithm that are carried in a preset order, and the preset order is determined based on the priority of the first security algorithm and the priority of the second security algorithm. When the priority of the first security algorithm is higher than the priority of the second security algorithm, the information about the first security algorithm is located before the information about the second security algorithm, so that the terminal device preferentially reads the information about the security algorithm with a higher priority.

In a possible design, the first security algorithm is a secure hash algorithm SHA256 or a SHA512, and the second security algorithm is a message digest MD5 algorithm.

In a possible design, the first security algorithm is a SHA256, and the second security algorithm is a SHA512.

In a possible design, the authentication vector request response further carries a third hash value, and the third hash value is calculated based on the fourth security algorithm. The fourth security algorithm is an MD5 algorithm. That the serving call session control function network element selects, from the first hash value and the second hash value, a hash value corresponding to the third security algorithm includes: The serving call session control function network element selects the hash value corresponding to the third security algorithm from the first hash value, the second hash value, and the third hash value. The authentication challenge request message further carries information about the fourth security algorithm, and the third security algorithm is the first security algorithm, the second security algorithm, or the fourth security algorithm.

In other words, when the first security algorithm is a SHA256, and the second security algorithm is a SHA512, the serving call session control function network element can further provide the information about the fourth security algorithm for the terminal device by using the authentication challenge request message, so that the terminal device determines a security algorithm from the first security algorithm, the second security algorithm, and the fourth security algorithm as the third security algorithm. The serving call session control function network element can further obtain, from the home subscriber server by using the authentication vector request response, the third hash value calculated by using the fourth security algorithm. After determining the third security algorithm, the serving call session control function network element determines the hash value corresponding to the third security algorithm from the first hash value, the second hash value, and the third hash value, to calculate the second authentication response by using the third security algorithm and the hash value corresponding to the third security algorithm. In other words, regardless of which security algorithm of the first security algorithm, the second security algorithm, and the fourth security algorithm is supported by the terminal device, the terminal device and the serving call session control function network element can calculate the authentication response based on a same security algorithm (that is, the third security algorithm), to authenticate the terminal device.

According to a sixth aspect, an embodiment of this application provides an authentication method. The method may be performed by a terminal device, or may be a chip applied to the terminal device. The following provides descriptions by using an example in which the method is performed by the terminal device. The method includes: The terminal device receives an authentication challenge request message from a serving call session control function network element. The authentication challenge request message carries information about a first security algorithm and information about a second security algorithm. The terminal device determines a third security algorithm, where the third security algorithm is the first security algorithm or the second security algorithm. The terminal device calculates a hash value of a security parameter based on the third security algorithm. The terminal device calculates an authentication response based on the third security algorithm and the hash value. The terminal device sends a registration request message to the serving call session control function network element. The registration request message carries the authentication response, and the authentication response is used to authenticate the terminal device.

In other words, the terminal device can determine a security algorithm, that is, the third security algorithm, from information about security algorithms in the authentication challenge request message. Then, the terminal device indicates, to the serving call session control function network element by using a second registration request message, a security algorithm supported by the terminal device, that is, the third security algorithm, so that the serving call session control function network element calculates a second authentication response by using the third security algorithm. Therefore, the terminal device can be authenticated.

In a possible design, the authentication challenge request message includes the information about the first security algorithm and the information about the second security algorithm that are carried in a preset order, and the preset order is determined based on a priority of the first security algorithm and a priority of the second security algorithm.

In a possible design, that the terminal device determines a third security algorithm includes: The terminal device determines, as the third security algorithm, a $1^{st}$ security algorithm that can be identified by the terminal device and that is in the authentication challenge request message.

Because the authentication challenge request message carries information about security algorithms in a preset order, the terminal device preferentially identifies information about a security algorithm with a high priority, to ensure that the terminal device calculates the authentication response by using the security algorithm that is with the high priority and that is supported by the terminal device. Therefore, security performance of an authentication process is ensured.

In a possible design, that the terminal device determines a third security algorithm includes: The terminal device determines a security algorithm with a higher priority from the first security algorithm and the second security algorithm as the third security algorithm. In other words, the terminal device determines a security algorithm, that is, the third security algorithm, from security algorithms in the authentication challenge request message based on priorities of the security algorithms in the authentication challenge request message. Because a priority of a security algorithm affects security performance of an authentication process to some extent, the terminal device determines the third security algorithm based on the priority of the security algorithm, to ensure the security performance of the authentication process.

In a possible design, the first security algorithm is a secure hash algorithm SHA256 or a SHA512, and the second security algorithm is a message digest MD5 algorithm.

In a possible design, the first security algorithm is a SHA256, and the second security algorithm is a SHA512.

In a possible design, the authentication challenge request message carries the information about the first security algorithm, the information about the second security algorithm, and information about a fourth security algorithm. That the terminal device determines a third security algorithm includes: The terminal device determines the third security algorithm from the first security algorithm, the second security algorithm, and the fourth security algorithm. The third security algorithm is the first security algorithm, the second security algorithm, or the fourth security algorithm.

In other words, when the first security algorithm is a SHA256, and the second security algorithm is a SHA512, the serving call session control function network element can further provide the information about the fourth security algorithm for the terminal device by using the authentication challenge request message, so that the terminal device determines a security algorithm from the first security algorithm, the second security algorithm, and the fourth security algorithm as the third security algorithm. In other words, regardless of which security algorithm of the first security algorithm, the second security algorithm, and the fourth security algorithm is supported by the terminal device, the terminal device and the serving call session control function network element can calculate the authentication response based on a same security algorithm (that is, the third security algorithm), to implement an authentication process of the terminal device.

According to a seventh aspect, an embodiment of this application provides a communication apparatus. The communication apparatus may be the terminal device in any one of the first aspect or the possible designs of the first aspect, an apparatus disposed in the terminal device, or a chip that implements a function of the terminal device. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The sending unit is configured to send a first registration request message to a serving call session control function network element. The first registration request message carries information about security algorithms that can be supported by the communication apparatus, and the security algorithms include at least one of the following: a first security algorithm or a second security algorithm. The receiving unit is configured to receive an authentication challenge message from the serving call session control function network element. The authentication challenge message includes information about a third security algorithm, and the third security algorithm is one of the security algorithms that can be supported by the communication apparatus. The processing unit is configured to calculate a hash value of a security parameter based on the third security algorithm. The processing unit is further configured to calculate an authentication response based on the third security algorithm and the hash value. The sending unit is further configured to send a second registration request message to the serving call session control function network element. The second registration request message carries the authentication response, and the authentication response is used to authenticate the communication apparatus.

In a possible design, the first security algorithm is a secure hash algorithm SHA256, and the second security algorithm is a secure hash algorithm SHA512.

According to an eighth aspect, an embodiment of this application provides a communication apparatus. The communication apparatus may be the serving call session control function network element in any one of the second aspect or the possible designs of the second aspect, an apparatus disposed in the serving call session control function network element, or a chip that implements a function of the service call session control function network element. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The receiving unit is configured to receive a first registration request message from a terminal device. The first registration request message includes information about security algorithms that can be supported by the terminal device, and the security algorithms include at least one of the following: a first security algorithm or a second security algorithm. The sending unit is configured to send an authentication vector request message to a home subscriber server. The authentication vector request message includes the information about the security algorithms that can be supported by the terminal device. The receiving unit is further configured to receive an authentication vector request response returned by the home subscriber server. The authentication vector request response includes a hash value and information about a third security algorithm, the hash value is obtained through calculation based on the third security algorithm, and the third security algorithm is one of the security algorithms that can be supported by the terminal device. The sending unit is further configured to send an authentication challenge message to the terminal device, and the authentication challenge message includes the information about the third security algorithm. The receiving unit is further configured to receive a second registration request message from the terminal device, and the second registration request message carries a first authentication response. The processing unit is configured to calculate a second authentication response based on the third security algorithm and the hash value. The processing unit is further configured to check the first authentication response by using the second authentication response, to obtain an authentication result of the terminal device.

In a possible design, the first security algorithm is a secure hash algorithm SHA256, and the second security algorithm is a secure hash algorithm SHA512.

According to a ninth aspect, an embodiment of this application provides a communication apparatus. The communication apparatus may be the home subscriber server in any one of the third aspect or the possible designs of the third aspect, an apparatus disposed in the home subscriber server, or a chip that implements a function of the home subscriber server. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The receiving unit is configured to receive an authentication vector request message from a serving call session control function network element. The authentication vector request message includes information about security algorithms that can be supported by the terminal device, and the security algorithms include at least one of the following: a first security algorithm or a second security algorithm. The processing unit is configured to calculate a hash value of a security parameter based on a third security algorithm, where the third security algorithm is one of the security algorithms that can be supported by the terminal device. The sending unit is configured to return an authentication vector request response to the serving call session control function network element, where the authentication vector request response carries the hash value and information about the third security algorithm.

In a possible design, the first security algorithm is a secure hash algorithm SHA256, and the second security algorithm is a secure hash algorithm SHA512.

According to a tenth aspect, an embodiment of this application provides a communication apparatus. The communication apparatus may be the home subscriber server in any one of the fourth aspect or the possible designs of the fourth aspect, an apparatus disposed in the home subscriber server, or a chip that implements a function of the home subscriber server. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The receiving unit is configured to receive an authentication vector request message from a serving call session control function network element. The processing unit is configured to calculate a first hash value of a security parameter based on a first security algorithm. The processing unit is further configured to calculate a second hash value of the security parameter based on a second security algorithm. The sending unit is configured to return an authentication vector request response to the serving call session control function network element, where the authentication vector request response carries the first hash value and the second hash value.

In a possible design, the authentication vector request response includes the first hash value and the second hash value that are carried in a preset order, and the preset order is determined based on a priority of the first security algorithm and a priority of the second security algorithm.

In a possible design, the first security algorithm is a secure hash algorithm SHA256 or a secure hash algorithm SHA512, and the second security algorithm is a message digest MD5 algorithm.

According to an eleventh aspect, an embodiment of this application provides a communication apparatus. The communication apparatus may be the serving call session control function network element in any one of the fifth aspect or the possible designs of the fifth aspect, an apparatus disposed in the serving call session control function network element, or a chip that implements a function of the service call session control function network element. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The receiving unit is configured to receive a first registration request message from a terminal device. The sending unit is configured to send an authentication vector request message to a home subscriber server. The receiving unit is further configured to receive an authentication vector request response returned by the home subscriber server, where the authentication vector request response carries a first hash value and a second hash value, the first hash value is calculated based on a first security algorithm, and the second hash value is calculated based on a second security algorithm. The sending unit is further configured to send an authentication challenge request message to the terminal device, and the authentication challenge request message carries information about the first security algorithm and information about the second security algorithm. The receiving unit is further configured to receive a second registration request message from the terminal device, where the second registration request message includes a first authentication response and information about a third security algorithm, the first authentication response is calculated based on the third security algorithm, and the third security algorithm is the first security algorithm or the second security algorithm. The processing unit is configured to select, from the first hash value and the second hash value, a hash value corresponding to the third security algorithm. The processing unit is further configured to calculate a second authentication response based on the third security algorithm and the hash value corresponding to the third security algorithm. The processing unit is further configured to check the first authentication response by using the second authentication response, to obtain an authentication result of the terminal device.

In a possible design, the authentication vector request response includes the first hash value and the second hash value that are carried in a preset order, and the preset order is determined based on a priority of the first security algorithm and a priority of the second security algorithm. The processing unit is specifically configured to select, from the first hash value and the second hash value based on the preset order, the hash value corresponding to the third security algorithm.

In a possible design, the authentication challenge request message includes the information about the first security algorithm and the information about the second security algorithm that are carried in a preset order, and the preset order is determined based on the priority of the first security algorithm and the priority of the second security algorithm.

In a possible design, the first security algorithm is a secure hash algorithm SHA256 or a secure hash algorithm SHA512, and the second security algorithm is a message digest MD5 algorithm.

According to a twelfth aspect, an embodiment of this application provides a communication apparatus. The communication apparatus may be the terminal device in any one of the sixth aspect or the possible designs of the sixth aspect, an apparatus disposed in the terminal device, or a chip that implements a function of the terminal device. The communication apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

The communication apparatus includes a sending unit, a receiving unit, and a processing unit. The receiving unit is configured to receive an authentication challenge request message from a serving call session control function network element, where the authentication challenge request message carries information about a first security algorithm and information about a second security algorithm. The processing unit is configured to determine a third security algorithm, where the third security algorithm is the first security algorithm or the second security algorithm. The processing unit is further configured to calculate a hash value of a security parameter based on the third security algorithm. The processing unit is further configured to calculate an authentication response based on the third security algorithm and the hash value. The sending unit is configured to send a registration request message to the serving call session control function network element, where the registration request message carries the authentication response, and the authentication response is used to authenticate the communication apparatus.

In a possible design, the authentication challenge request message includes the information about the first security algorithm and the information about the second security algorithm that are carried in a preset order, and the preset order is determined based on a priority of the first security algorithm and a priority of the second security algorithm.

In a possible design, the processing unit is specifically configured to determine, as the third security algorithm, a $1^{st}$ security algorithm that can be identified by the processing unit and that is in the authentication challenge request message.

In a possible design, the first security algorithm is a secure hash algorithm SHA256 or a secure hash algorithm SHA512, and the second security algorithm is a message digest MD5 algorithm.

According to a thirteenth aspect, an embodiment of this application provides a communication apparatus, including a processor and a memory. The memory is configured to store computer instructions. When the processor executes the instructions, the communication apparatus is enabled to perform the method performed by the terminal device in any one of the foregoing aspects or the possible designs of the foregoing aspects. The communication apparatus may be the terminal device in any one of the first aspect or the possible designs of the first aspect, or a chip that implements a function of the terminal device. Alternatively, the communication apparatus may be the terminal device in any one of the sixth aspect or the possible designs of the sixth aspect, or a chip that implements a function of the terminal device.

According to a fourteenth aspect, an embodiment of this application provides a communication apparatus, including a processor. The processor is coupled to a memory, and is configured to read and execute instructions in the memory, to enable the communication apparatus to perform the method performed by the terminal device in any one of the foregoing aspects or the possible designs of the foregoing aspects. The communication apparatus may be the terminal device in any one of the first aspect or the possible designs of the first aspect, or a chip that implements a function of the terminal device. Alternatively, the communication apparatus may be the terminal device in any one of the sixth aspect or the possible designs of the sixth aspect, or a chip that implements a function of the terminal device.

According to a fifteenth aspect, an embodiment of this application provides a chip, including a logic circuit and an input/output interface. The input/output interface is configured to communicate with a module other than the chip. For example, the chip may be a chip that implements a function of the terminal device in any one of the first aspect or the possible designs of the first aspect. The input/output interface outputs a first registration request message and a second registration request message. The input/output interface inputs an authentication challenge request message. The logic circuit is configured to run a computer program or instructions, to implement the method in any one of the first aspect or the possible designs of the first aspect. Alternatively, the chip may be a chip that implements a function of the terminal device in any one of the sixth aspect or the possible designs of the sixth aspect. The input/output interface outputs a registration request message, and the input/output interface inputs an authentication challenge request message. The logic circuit is configured to run a computer program or instructions, to implement the method in any one of the sixth aspect or the possible designs of the sixth aspect.

According to a sixteenth aspect, an embodiment of this application provides a communication apparatus, including a processor and a memory. The memory is configured to store computer instructions. When the processor executes the instructions, the communication apparatus is enabled to perform the method performed by the serving call session control function network element in any one of the foregoing aspects or the possible designs of the foregoing aspects. The communication apparatus may be the serving call session control function network element in any one of the second aspect or the possible designs of the second aspect, or a chip that implements a function of the serving call session control function network element. Alternatively, the communication apparatus may be the serving call session control function network element in any one of the fifth aspect or the possible designs of the fifth aspect, or a chip that implements a function of the serving call session control function network element.

According to a seventeenth aspect, an embodiment of this application provides a communication apparatus, including a processor. The processor is coupled to a memory, and is configured to read and execute instructions in the memory, to enable the communication apparatus to perform the method performed by the serving call session control function network element in any one of the foregoing aspects or the possible designs of the foregoing aspects. The communication apparatus may be the serving call session control function network element in any one of the second aspect or the possible designs of the second aspect, or a chip that implements a function of the serving call session control function network element. Alternatively, the communication apparatus may be the serving call session control function network element in any one of the fifth aspect or the possible designs of the fifth aspect, or a chip that implements a function of the serving call session control function network element.

According to an eighteenth aspect, an embodiment of this application provides a chip, including a logic circuit and an input/output interface. The input/output interface is configured to communicate with a module other than the chip. For example, the chip may be a chip that implements a function of the serving call session control function network element in any one of the second aspect or the possible designs of the second aspect. The input/output interface inputs a first registration request message, an authentication vector request response, and a second registration request message. The input/output interface outputs an authentication vector request message and an authentication challenge request message. The logic circuit is configured to run a computer program or instructions, to implement the method in any one of the second aspect or the possible designs of the second aspect. Alternatively, the chip may be a chip that implements a function of the serving call session control function network element in any one of the fifth aspect or the possible designs of the fifth aspect. The input/output interface inputs a first registration request message, an authentication vector request response, and a second registration request message, and the input/output interface outputs an authentication vector request message and an authentication challenge request message. The logic circuit is configured to run a computer program or instructions, to implement the method in any one of the fifth aspect or the possible designs of the fifth aspect.

According to a nineteenth aspect, an embodiment of this application provides a communication apparatus, including a processor and a memory. The memory is configured to store computer instructions. When the processor executes the instructions, the communication apparatus is enabled to perform the method performed by the home subscriber server in any one of the foregoing aspects or the possible designs of the foregoing aspects. The communication apparatus may be the home subscriber server in any one of the third aspect or the possible designs of the third aspect, or a chip that implements a function of the home subscriber server. Alternatively, the communication apparatus may be the home subscriber server in any one of the fourth aspect or the possible designs of the fourth aspect, or a chip that implements a function of the home subscriber server.

According to a twentieth aspect, an embodiment of this application provides a communication apparatus, including a processor. The processor is coupled to a memory, and is configured to read and execute instructions in the memory, to enable the communication apparatus to perform the method performed by the home subscriber server in any one of the foregoing aspects or the possible designs of the foregoing aspects. The communication apparatus may be the home subscriber server in any one of the third aspect or the possible designs of the third aspect, or a chip that implements a function of the home subscriber server. Alternatively, the communication apparatus may be the home subscriber server in any one of the fourth aspect or the possible designs of the fourth aspect, or a chip that implements a function of the home subscriber server.

According to a twenty-first aspect, an embodiment of this application provides a chip, including a logic circuit and an input/output interface. The input/output interface is configured to communicate with a module other than the chip. For example, the chip may be a chip that implements a function of the home subscriber server in any one of the third aspect or the possible designs of the third aspect. The input/output interface outputs an authentication vector request response. The input/output interface inputs an authentication vector request message. The logic circuit is configured to run a computer program or instructions, to implement the method in any one of the third aspect or the possible designs of the third aspect. Alternatively, the chip may be a chip that implements a function of the home subscriber server in any one of the fourth aspect or the possible designs of the fourth aspect. The input/output interface outputs an authentication vector request response, and the input/output interface inputs an authentication vector request message. The logic circuit is configured to run a computer program or instructions, to implement the method in any one of the fourth aspect or the possible designs of the fourth aspect.

According to a twenty-second aspect, an embodiment of this application provides a computer-readable storage medium. The computer-readable storage medium stores instructions, and when the instructions are run on a computer, the computer is enabled to perform the authentication method in any one of the foregoing aspects.

According to a twenty-third aspect, an embodiment of this application provides a computer program product including instructions. When the computer program product runs on a computer, the computer is enabled to perform the authentication method in any one of the foregoing aspects.

According to a twenty-fourth aspect, an embodiment of this application provides a circuit system. The circuit system includes a processing circuit, and the processing circuit is configured to perform the authentication method according to any one of the foregoing aspects.

According to a twenty-fifth aspect, an embodiment of this application provides a communication system. The communication system includes the terminal device, the serving call session control function network element, and the home subscriber server in any one of the foregoing aspects.

For technical effects brought by any design of the second aspect to the twenty-fifth aspect, refer to beneficial effects in the corresponding method provided above. Details are not described herein again.

BRIEF DESCRIPTION OF DRAWINGS

FIG. 3A and FIG. 3B are a schematic flowchart of another authentication method according to an embodiment of this application;

FIG. 4*a*-1 and FIG. 4*a*-2 are a schematic flowchart of still another authentication method according to an embodiment of this application;

FIG. 4*b*-1 and FIG. 4*b*-2 are a schematic flowchart of still another authentication method according to an embodiment of this application;

DESCRIPTION OF EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of this application, "a plurality of" includes two or more. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a relative concept in a specific manner. In embodiments of this application, "transmission" includes "sending" or "receiving".

First, a protocol (session initiation protocol, SIP) digest (digest) authentication mode in this application is described.

Figure 1:
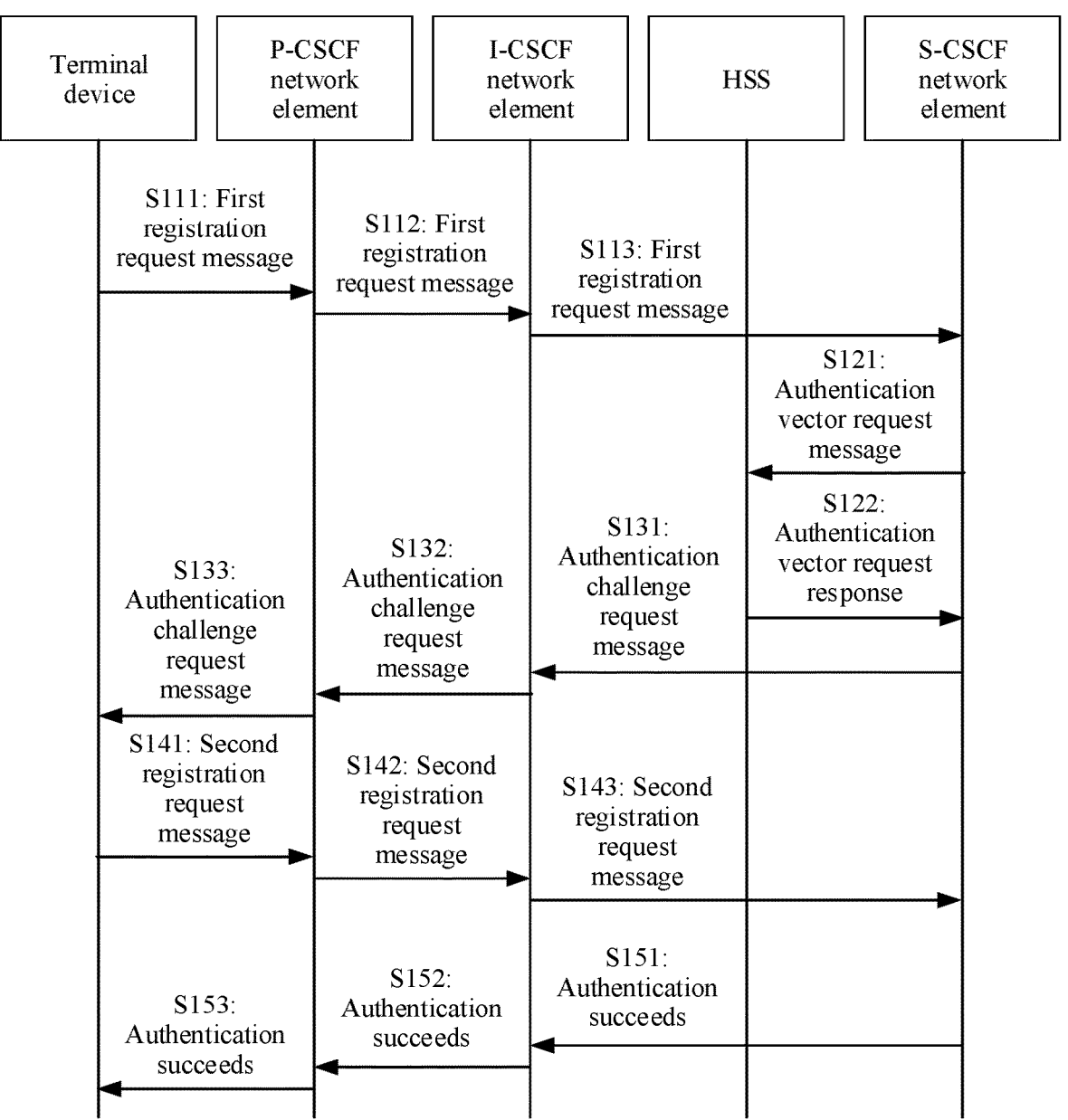
FIG. 1 is a schematic flowchart of an authentication method according to an embodiment of this application.

The protocol digest authentication mode is a mode commonly used by an internet protocol multimedia subsystem (internet protocol multimedia subsystem, IMS) to authenticate a terminal device. FIG. 1 shows processing steps of the protocol digest authentication mode.

S111: A terminal device sends a first registration request message to a proxy call session control function (proxy call session control function, P-CSCF) network element. Correspondingly, the proxy call session control function (proxy call session control function, P-CSCF) network element receives the first registration request message from the terminal device.

The first registration request message includes an identifier of the terminal device, for example, an IP multimedia private identity (IP multimedia private identity, IMPI).

S112: The P-CSCF network element sends the first registration request message to an interrogating call session control function (interrogating call session control function, I-CSCF) network element. Correspondingly, the I-CSCF network element receives the first registration request message from the P-CSCF network element.

S113: The I-CSCF network element sends the first registration request message to a serving call session control function (serving call session control function, S-CSCF) network element. Correspondingly, the S-CSCF network element receives the first registration request message from the I-CSCF network element.

The S-CSCF network element is a network element determined by an HSS. For example, after the I-CSCF network element performs S112, the I-CSCF network element sends a request to the home subscriber server (home subscriber server, HSS), to request the HSS to determine which S-CSCF network element processes the first registration request message. After receiving the request from the I-CSCF network element, the HSS determines which S-CSCF network element processes the first registration request message. Then, the HSS sends a Cx selection information (Cx-Selection-Info) message to the I-CSCF network element. Correspondingly, the I-CSCF network element receives the Cx-Selection-Info message from the HSS. The Cx-Selection-Info message indicates the S-CSCF network element that processes the first registration request message.

S121: The S-CSCF network element sends an authentication vector request message to the HSS. Correspondingly, the HSS receives the authentication vector request message from the S-CSCF network element.

The authentication vector request message includes the identifier of the terminal device, for example, the IMPI.

S122: The HSS sends an authentication vector request response to the S-CSCF network element. Correspondingly, the S-CSCF network element receives the authentication vector request response from the HSS.

The authentication vector request response may include but is not limited to the following parameters.

A first parameter is the IMPI. The IMPI is used to identify the terminal device.

A second parameter is realm (realm) information. The realm information indicates information about a realm in which the terminal performs authentication.

A third parameter is a security algorithm (algorithm), for example, a name of a message digest 5 (message digest 5, MD5) algorithm or an identifier of the MD5 algorithm.

A fourth parameter is qop. If qop is set to "auth", it indicates that only user authentication is performed. If qop is set to "auth-int", it indicates that user authentication and message body integrity protection are performed at the same time.

A fifth parameter is a hash value HA1. The hash value HA1 is a hash value obtained by calculating username (username), realm information, and password (password) by using the foregoing MD5 algorithm. For example, the hash value HA1 is a hash value obtained by combining the following three parameters:

HA1=username:realm:MD5 value of password.

HA1 indicates a hash value, username indicates a user name, realm indicates realm information, password indicates a password, and ":" indicates combination. That is, combination of the three parameters: username (username), realm information, and password (password) is first determined, and then a hash value of an entire parameter obtained through combination is determined.

S131: The S-CSCF network element sends an authentication challenge request message to the I-CSCF network element. Correspondingly, the I-CSCF network element receives the authentication challenge request message from the S-CSCF network element.

The authentication challenge request message may include but is not limited to the following parameters.

A first parameter is the IMPI. The IMPI is used to identify the terminal device.

A second parameter is realm information, and realm information herein is the same as "realm information" in S122.

A third parameter is a security algorithm (algorithm), for example, a name of an MD5 algorithm or an identifier of the MD5 algorithm.

A fourth parameter is qop, and qop herein is the same as "qop" in S122.

A fifth parameter is nonce. nonce is a random number generated by the S-CSCF network element.

S132: The I-CSCF network element sends the authentication challenge request message to the P-CSCF network element. Correspondingly, the P-CSCF network element receives the authentication challenge request message from the I-CSCF network element.

S133: The P-CSCF network element sends the authentication challenge request message to the terminal device. Correspondingly, the terminal device receives the authentication challenge request message from the P-CSCF network element.

S141: The terminal device sends a second registration request message to the P-CSCF network element. Correspondingly, the P-CSCF network element receives the second registration request message from the terminal device.

The second registration request message includes at least an authentication response (response). The authentication response is used to authenticate the terminal device. The authentication response is a value obtained by calculating username, realm information, password, nonce, digest-uri, and other parameters by using the MD5 algorithm. The authentication response is a hash value obtained by combining the following parameters:

response=HA1:nonce:n-c:cnonce:qop:MD5 value of HA2.

response indicates the authentication response, HA1 indicates a hash value obtained by performing MD5 calculation on username, realm information, and password, nonce indicates a random number generated by the S-CSCF network element, n-c indicates nonce-count, that is, a count value of a counter used by the terminal device to send the second registration request message by using a same nonce, cnonce is a random number generated by the terminal device, and a value of qop indicates that the authentication response is used for only authentication or for both authentication and message body integrity protection. The hash value HA2 is a hash value obtained by calculating method and digest-uri by using the MD5 algorithm. That is, combination of HA1, nonce, n-c, cnonce, qop, and HA2 is first determined, and then a hash value of an entire parameter obtained through combination is determined. The hash value HA2 is a hash value obtained by combining the following parameters:

HA2=method:MD5 value of digest-uri.

method indicates a hypertext transfer protocol (hyper text transfer protocol, HTTP) request method, digest-uri indicates information about a uniform resource identifier (uniform resource identifier, URI), and ":" indicates combination.

Optionally, the second registration request message further includes one or more of the following parameters.

A first parameter is the IMPI. The IMPI is used to identify the terminal device.

A second parameter is realm information, and realm information herein is the same as "realm information" in S122.

A third parameter is a security algorithm (algorithm), for example, a name of an MD5 algorithm or an identifier of the MD5 algorithm.

A fourth parameter is qop, and qop herein is the same as "qop" in S122.

A fifth parameter is nonce, and nonce herein is the same as "nonce" in S131.

A sixth parameter is cnonce. cnonce is a random number generated by the terminal device.

A seventh parameter is nonce-count. nonce-count indicates a count value of a counter used by the terminal device to send the second registration request message by using a same nonce.

An eighth parameter is digest-uri. digest-uri indicates information about the URI.

S142: The P-CSCF network element sends the second registration request message to the I-CSCF network element. Correspondingly, the I-CSCF network element receives the second registration request message from the P-CSCF network element.

S143: The I-CSCF network element sends the second registration request message to the S-CSCF network element. Correspondingly, the S-CSCF network element receives the second registration request message from the I-CSCF network element.

After the S-CSCF network element receives the second registration request message, the S-CSCF network element calculates an authentication response based on the hash value HA1 and the security algorithm in the authentication vector request response. When the S-CSCF network element determines that the authentication response calculated by the S-CSCF network element is different from the authentication response in the second registration request message, the S-CSCF network element determines that authentication fails. On the contrary, when the S-CSCF network element determines that the authentication response calculated by the S-CSCF network element is the same as the authentication response in the second registration request message, the S-CSCF network element determines that authentication succeeds, and performs S151.

S151: The S-CSCF network element sends an authentication success message to the I-CSCF network element. Correspondingly, the S-CSCF network element receives the authentication success message from the I-CSCF network element.

S152: The I-CSCF network element sends the authentication success message to the P-CSCF network element. Correspondingly, the P-CSCF network element receives the authentication success message from the I-CSCF network element.

S153: The P-CSCF network element sends the authentication success message to the terminal device. Correspondingly, the terminal device receives the authentication success message from the P-CSCF network element.

Because the MD5 algorithm is an insecure algorithm, one solution is to enable some terminal devices to support a new security algorithm such as a secure hash algorithm (secure hash algorithm, SHA) 256 or a SHA512, and complete authentication through an authentication response calculated by using the SHA256 or the SHA512.

Clearly, this solution results in the following situation: Because some terminal devices support the SHA256 or the SHA512, the some terminal devices need to use the SHA256 or the SHA512 to calculate the authentication response; and other terminal devices do not support the SHA256 or the SHA512, and still use the MD5 algorithm to calculate the authentication response. In this case, how to enable terminal devices that support different security algorithms to complete authentication is an urgent problem to be resolved.

Figure 2:
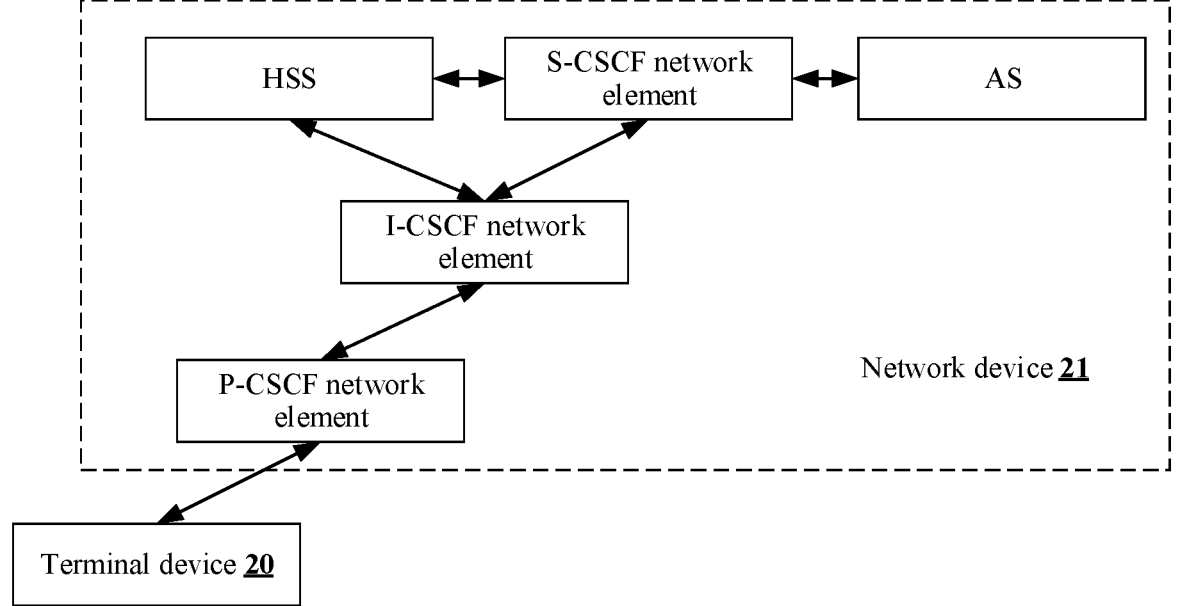
FIG. 2 is a schematic diagram of a network architecture according to an embodiment of this application.

In view of this, an embodiment of this application provides an authentication method. The authentication method in this embodiment of this application may be applied to an IMS network. As shown in FIG. 2, a communication system may include a terminal device 20 and a network device 21. The terminal device 20 is communicatively connected to the network device 21. FIG. 2 is merely a schematic diagram, and does not constitute a limitation on an application scenario of the authentication method in this embodiment of this application.

The terminal device 20 may also be referred to as user equipment (user equipment, UE), for example, a mobile phone or a computer, or may be a cellular phone, a cordless phone, a session initiation protocol (session initiation protocol, SIP) phone, a wireless local loop (wireless local loop, WLL) station, a personal digital assistant (personal digital assistant, PDA) device, a laptop computer, a handheld communication device, a handheld computing device, a satellite wireless device, a wireless modem card, a set top box (set top box, STB), a customer premise equipment (customer premise equipment, CPE), and/or other devices configured to communicate over a wireless system.

The network device 21 includes the following network elements: a P-CSCF network element, an I-CSCF network element, an S-CSCF network element connection, an HSS, and an application server (application server, AS). Connection relationships between network elements are as follows: The terminal device is connected to the S-CSCF network element through the P-CSCF network element and the I-CSCF network element, the S-CSCF network element is further separately connected to the HSS and the AS, and the I-CSCF network element is further connected to the HSS, as shown in FIG. 2. The P-CSCF network element is used to complete access of the terminal device, that is, the terminal device accesses the IMS by using the P-CSCF network element. The I-CSCF network element is used to select an S-CSCF network element for interworking between different carriers or local area networks, to implement functions such as network shielding. The S-CSCF network element is used to provide core functions such as session control and routing. The P-CSCF network element, the I-CSCF network element, and the S-CSCF network element implement a call session control function (call session control function, CSCF), to complete functions such as call, session control, and routing. The HSS is configured to store a security algorithm of the terminal device, for example, subscription data and configuration data. The AS is a server that provides application services for the terminal device.

It should be noted that the terminal device shown in FIG. 2 may access the IMS by using a fourth generation (4th generation, 4G) network, or may access the IMS by using a fifth generation (5th generation, 5G) network. This is not limited in this embodiment of this application. In addition, FIG. 2 is merely an example framework diagram. In addition to the functional network elements shown in FIG. 2, the IMS may further include another functional network element. This is not limited in this embodiment of this application.

The communication system and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as a network architecture evolves and a new service scenario emerges.

The following describes in detail the authentication method provided in embodiments of this application.

It should be noted that, in the following embodiments of this application, names of messages between network elements, names of parameters in messages, or the like are merely examples, and there may be other names during specific implementation. In embodiments of this application, information about an $X^{th}$ security algorithm may be but is not limited to one of the following: a name of the $X^{th}$ security algorithm, an identifier of the $X^{th}$ security algorithm, or the like. The $X^{th}$ security algorithm may be a first security algorithm, a second security algorithm, a third security algorithm, a fourth security algorithm, or the like. Unified descriptions are provided herein. Details are not described below again.

Figure 3A:
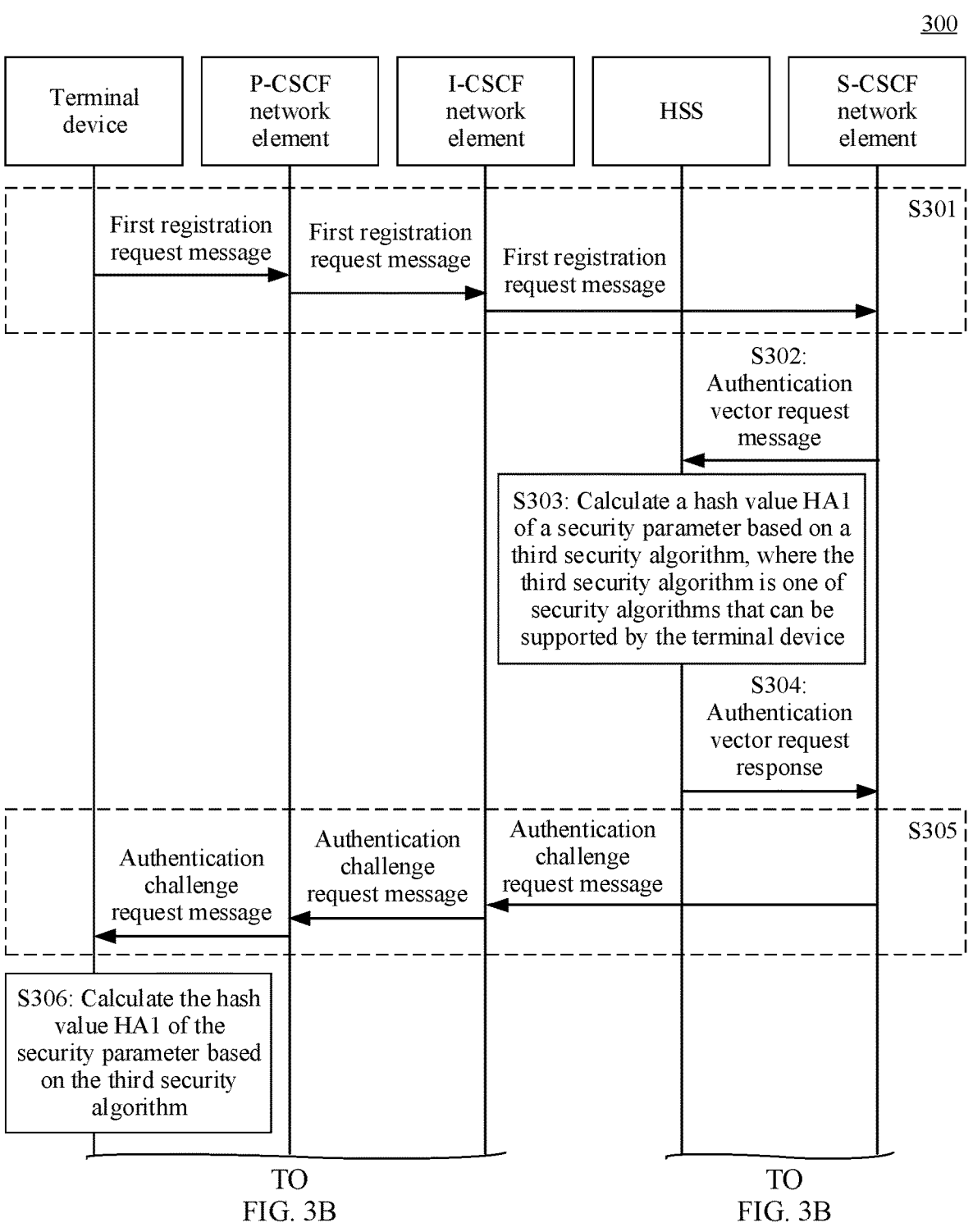

An embodiment of this application provides an authentication method 300. The authentication method 300 is applied to an authentication process. Refer to FIG. 3A and FIG. 3B. The authentication method 300 includes the following steps.

S301: A terminal device sends a first registration request message to an S-CSCF network element. Correspondingly, the S-CSCF network element receives the first registration request message from the terminal device.

The first registration request message includes an identifier (for example, an IMPI) of the terminal device. In addition, the first registration request message may further include at least one piece of the following information:

1. Information about security algorithms that can be supported by the terminal device. The information about the security algorithms includes a name of the security algorithm, an identifier of the security algorithm, or the like. The security algorithms include at least one of the following: a first security algorithm or a second security algorithm. The first security algorithm is a SHA256, and the second security algorithm is a SHA512. For example, the information about the security algorithms may be carried in a "capability information (capability information)" field in the first registration request message.

2. Indication information. The indication information may be at least one of the following: information indicating that "an MD5 algorithm has been abolished", information indicating that "the MD5 algorithm is not supported", information indicating that "a new security algorithm is supported", information indicating that "a terminal device is a terminal device of a new version", or the like. The terminal device of the new version is a terminal device that supports the first security algorithm and/or the second security algorithm. In this way, the S-CSCF network element may explicitly learn that the terminal device supports a new security algorithm, for example, the first security algorithm or the second security algorithm.

For a specific implementation process of S301, refer to related descriptions of S111, S112, and S113. Details are not described herein again.

S302: The S-CSCF network element sends an authentication vector request message to an HSS. Correspondingly, the HSS receives the authentication vector request message from the S-CSCF network element.

The authentication vector request message includes the identifier (IMPI) of the terminal device. In addition, the authentication vector request message further includes at least one of the following: information about security algorithms that can be supported by the terminal device and indication information. The indication information in S302 is the same as the indication information in S301. When the authentication vector request message includes the "information about the security algorithms that can be supported by the terminal device", the information about the security algorithms in the authentication vector request message is consistent with the information about the security algorithms in the first registration request message. For example, when the first registration request message includes an identifier of the SHA256, the authentication vector request message includes the identifier of the SHA256. When the first registration request message includes an identifier of the SHA512, the authentication vector request message includes the identifier of the SHA512. When the first registration request message includes the identifier of the SHA256 and the identifier of the SHA512, the authentication vector request message includes the identifier of the SHA256 and the identifier of the SHA512.

S303: The HSS calculates a hash value HA1 of a security parameter based on a third security algorithm.

The third security algorithm is one of the security algorithms that can be supported by the terminal device.

If the authentication vector request message received by the HSS includes "the information about the security algorithms that can be supported by the terminal device", a process in which the HSS determines the third security algorithm is as follows: When the authentication vector request message includes the identifier of the SHA256, the third security algorithm is the SHA256. When the authentication vector request message includes the identifier of the SHA512, the third security algorithm is the SHA512. When the authentication vector request message includes the identifier of the SHA256 and the identifier of the SHA512, the HSS determines an algorithm from the SHA256 and the SHA512 as the third security algorithm. For example, the HSS selects a security algorithm with a higher priority based on a locally configured priority of the SHA256 and a locally configured priority of the SHA512 as the third security algorithm.

If the authentication vector request message received by the HSS includes the "indication information", a process in which the HSS determines the third security algorithm is as follows: The HSS determines the third security algorithm based on the indication information. For example, the HSS learns, based on the indication information, that the terminal device supports a new security algorithm. Then, the HSS determines an algorithm from the SHA256 and the SHA512 as the third security algorithm. Alternatively, when the SHA256 is configured in the HSS, and the SHA512 is not configured, the HSS uses the SHA256 as the third security algorithm. Alternatively, when the SHA256 is not configured in the HSS, and the SHA512 is configured, the HSS uses the SHA512 as the third security algorithm.

The security parameter is a configuration parameter of the terminal device identified by the IMPI. For example, the security parameter includes username, password, and realm name for logging in to the terminal device.

For example, the HSS calculates the three parameters: username, password, and realm information by using the third security algorithm, to obtain a hash value HA1 corresponding to the third security algorithm. For example, the third security algorithm is the SHA256, and the hash value HA1 is a hash value obtained by combining the following parameters:

HA1=username:realm:SHA256 value of password.

HA1 indicates a hash value corresponding to the third security algorithm, username indicates a user name, realm indicates realm information, password indicates a password, and ":" indicates combination.

S304: The HSS sends an authentication vector request response to the S-CSCF network element. Correspondingly, the S-CSCF network element receives the authentication vector request response from the HSS.

The authentication vector request response carries the hash value HA1 and information about the third security algorithm. The HA1 is a value calculated by the HSS in S303. The third security algorithm is a security algorithm used by the HSS to calculate the hash value HA1 in S303, and the information about the third security algorithm includes a name of the third security algorithm, an identifier of the third security algorithm, or the like. Certainly, the authentication vector request response may further include another parameter. For details, refer to related descriptions of S122. Details are not described herein again.

S305: The S-CSCF network element sends an authentication challenge request message to the terminal device. Correspondingly, the terminal device receives the authentication challenge request message from the S-CSCF network element.

The authentication challenge request message includes the information about the third security algorithm, for example, the name of the third security algorithm and the identifier of the third security algorithm. The third security algorithm in the authentication challenge request message is consistent with the third security algorithm in the authentication vector request response. For example, when the authentication vector request response includes the identifier of the SHA256, the authentication challenge request message includes the identifier of the SHA256. Certainly, the authentication challenge request message may further include another parameter. For details, refer to related descriptions of S131. Details are not described herein again.

For an implementation process of S305, refer to related descriptions of S131, S132, and S133. Details are not described herein again.

It should be noted that, when the terminal device supports one type of security algorithm (such as the SHA256 or the SHA512), the authentication challenge request message may not carry the information about the third security algorithm. Because the terminal device supports one type of security algorithm, the terminal device can determine which security algorithm is used to calculate the hash value HA1, and the S-CSCF network element does not need to indicate the security algorithm by using the authentication challenge request message. Therefore, signaling overheads are reduced.

S306: The terminal device calculates the hash value HA1 of the security parameter based on the third security algorithm.

The third security algorithm is a security algorithm indicated by the authentication challenge request message. For example, when the authentication challenge request message includes the identifier of the SHA256, the third security algorithm is the SHA256. Alternatively, the third security algorithm is determined by the terminal device by using the security algorithms that can be supported by the terminal device. For example, when the terminal device supports only the SHA256, the third security algorithm is the SHA256.

The security parameter is a configuration parameter of the terminal device. The security parameter includes username, password, and realm information for logging in to the terminal device.

For example, the terminal device calculates the three parameters: username, password, and realm information by using the SHA256 (that is, the third security algorithm), to obtain a hash value HA1 corresponding to the SHA256 (that is, the third security algorithm).

S307: The terminal device calculates a first authentication response based on the third security algorithm and the hash value HA1.

For example, the third security algorithm is still the SHA256, a calculation process of the first authentication response is as follows:

First, the terminal device calculates method and digest-uri by using the SHA256, to obtain a hash value HA2. For example, the hash value HA2 is a hash value obtained by combining the following parameters:

HA2=method:SHA256 value of digest-uri.

method indicates an HTTP request method, digest-uri indicates information about a URI, and ":" indicates combination.

Then, the terminal device calculates HA1, nonce, n-c, cnonce, qop, and HA2 by using the SHA256, to obtain the first authentication response. For example, the first authentication response is a hash value obtained by combining the following parameters:

response=HA1:nonce:n-c:cnonce:qop:SHA256 value of HA2.

response indicates the first authentication response, HA1 indicates a hash value obtained by performing SHA256 calculation on username, realm information, and password, nonce indicates a random number generated by the S-CSCF network element, n-c indicates nonce-count, that is, a count value of a counter used by the terminal device to send a second registration request message by using a same nonce, cnonce is a random number generated by the terminal device, and a value of qop indicates that the first authentication response is used for only authentication or for both authentication and message body integrity protection. The hash value HA2 is a hash value obtained by calculating method and digest-uri by using the SHA256 algorithm. The hash value HA2 is a hash value obtained by combining the following parameters:

HA2=method:SHA256 value of digest-uri.

method indicates an HTTP request method, digest-uri indicates information about a URI, and ":" indicates combination.

S308: The terminal device sends the second registration request message to the S-CSCF network element. Correspondingly, the S-CSCF network element receives the second registration request message from the terminal device.

The second registration request message carries the first authentication response. The first authentication response carried in the second registration request message is the authentication response obtained by the terminal device through calculation in S307. Certainly, the second registration request message may further include another parameter. For details, refer to related descriptions of S141. Details are not described herein again.

For an implementation process of S308, refer to related descriptions of S141, S142, and S143. Details are not described herein again.

S309: The S-CSCF network element calculates a second authentication response based on the third security algorithm and the hash value HA1.

The third security algorithm is determined by the S-CSCF network element based on the authentication vector request response in S303, and is consistent with the security algorithm in the authentication vector request response. The hash value HA1 is a hash value carried in the authentication vector request response in S303. Alternatively, the third security algorithm may be determined by the S-CSCF network element based on the second registration request message in S308, and is consistent with the security algorithm carried by the terminal device in the second registration request message.

For example, the third security algorithm is the SHA256, a calculation process of the second authentication response is as follows:

First, the S-CSCF network element calculates method and digest-uri by using the SHA256, to obtain a hash value HA2.

Then, the S-CSCF network element calculates HA1, nonce, n-c, cnonce, qop, and HA2 by using the SHA256, to obtain the second authentication response.

S310: The S-CSCF network element checks the first authentication response by using the second authentication response, to obtain an authentication result of the terminal device.

The first authentication response is the first authentication response carried in the second registration request message in S308. The second authentication response is the second authentication response obtained by the S-CSCF network element through calculation in S309.

For example, when the S-CSCF network element determines that the first authentication response is different from the second authentication response, the S-CSCF network element determines that authentication on the terminal device fails. On the contrary, when the S-CSCF network element determines that the first authentication response is the same as the second authentication response, the S-CSCF network element determines that authentication on the terminal device succeeds, and the S-CSCF network element sends an authentication success message to the terminal device. For details, refer to related descriptions of S151, S152, and S153. Details are not described herein again.

It should be noted that, for a terminal device that supports the MD5 algorithm, an authentication process of the terminal device may be completed by performing a processing procedure shown in FIG. 1. For the S-CSCF network element, the S-CSCF network element determines that the first registration request message does not carry information about a security algorithm. Therefore, the S-CSCF network element may determine that the terminal device does not support a new security algorithm, for example, the first security algorithm or the second security algorithm. The S-CSCF network element still uses the processing procedure shown in FIG. 1 to authenticate the terminal device. An interaction process between the S-CSCF network element and the HSS is still shown in FIG. 1.

In this way, for a terminal device that supports a new security algorithm (for example, the first security algorithm and/or the second security algorithm), the terminal device adds information about the security algorithm to the first registration request message, to indicate, to the S-CSCF network element, the security algorithm supported by the terminal device. The terminal device and the S-CSCF network element may calculate an authentication response based on a same security algorithm. For example, the terminal device calculates the first authentication response based on the third security algorithm, and the S-CSCF network element calculates the second authentication response based on the third security algorithm. Then, the S-CSCF network element checks the first authentication response by using the second authentication response, so that the terminal device that supports the "first security algorithm and/or the second security algorithm" can be authenticated. This prevents an authentication failure caused by using different security algorithms by the terminal device and the S-CSCF network element. In addition, for a terminal device that does not support the first security algorithm and the second security algorithm, the terminal device does not need to carry information about a security algorithm in the first registration request message. In this case, the S-CSCF network element may determine that the security algorithm is the MD5 algorithm, and calculate an authentication response by using the MD5 algorithm, to implement an authentication process of the terminal device.

An embodiment of this application provides an authentication method 400. The authentication method 400 is applied to an authentication process. Refer to FIG. 4*a*-1, FIG. 4*a*-2, FIG. 4*b*-1, and FIG. 4*b*-2. The authentication method 400 includes the following steps:

S401: A terminal device sends a first registration request message to an S-CSCF network element. Correspondingly, the S-CSCF network element receives the first registration request message from the terminal device.

For descriptions of the first registration request message, refer to related descriptions of the "first registration request message" in S111. Details are not described herein again. For an implementation process of S401, refer to related descriptions of S111, S112, and S113. Details are not described herein again.

S402: The S-CSCF network element sends an authentication vector request message to an HSS. Correspondingly, the HSS receives the authentication vector request message from the S-CSCF network element.

For the authentication vector request message, refer to related descriptions of the "authentication vector request message" in S121. Details are not described herein again. For an implementation process of S402, refer to related descriptions of S121. Details are not described herein again.

For the HSS, the authentication method 400 in this embodiment of this application is described in two cases based on a quantity of security algorithms configured by the HSS.

Figures 1, 2, 4A:
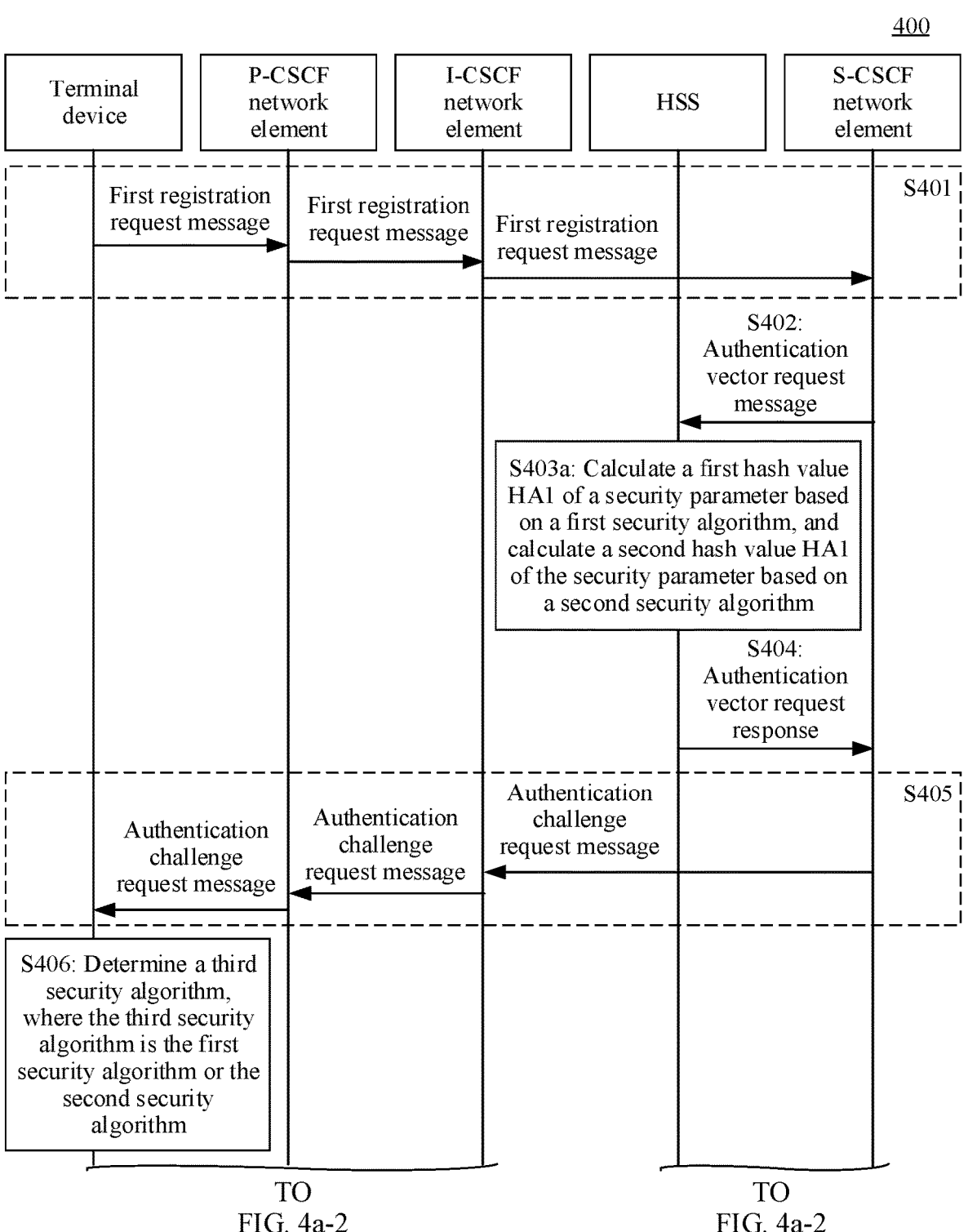
Figures 2, 4A:
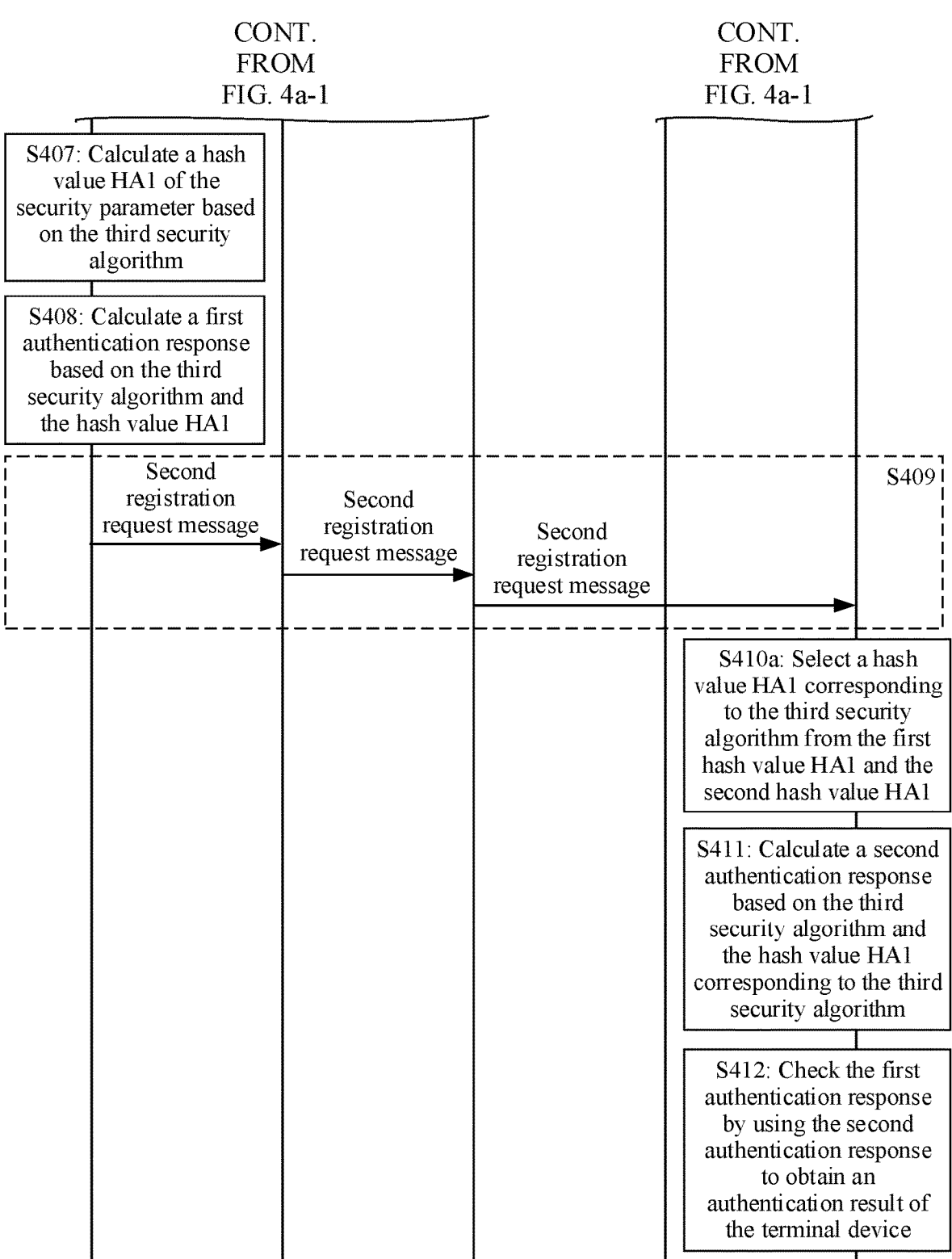

In a first case, when the HSS configures a first security algorithm and a second security algorithm, the HSS performs S403*a* shown in FIG. 4*a*-1.

S403*a*: The HSS calculates a first hash value HA1 of a security parameter based on the first security algorithm, and calculates a second hash value HA1 of the security parameter based on the second security algorithm.

The first security algorithm is a SHA256, and the second security algorithm is an MD5 algorithm. Alternatively, the first security algorithm is a SHA512, and the second security algorithm is an MD5 algorithm. Alternatively, the first security algorithm is a SHA256, and the second security algorithm is a SHA512.

The security parameter includes username, password, and realm information for logging in to the terminal device.

For example, when the first security algorithm is the SHA256, and the second security algorithm is the MD5 algorithm, the HSS calculates the three parameters: username, password, and realm information by using the SHA256 (that is, the first security algorithm), to obtain the first hash value HA1 corresponding to the SHA256 (that is, the first security algorithm). The HSS calculates the three parameters of username, password, and realm information by using the MD5 algorithm (that is, the second security algorithm), to obtain the second hash value HA1 corresponding to the MD5 algorithm (that is, the second security algorithm).

Figures 1, 4B:
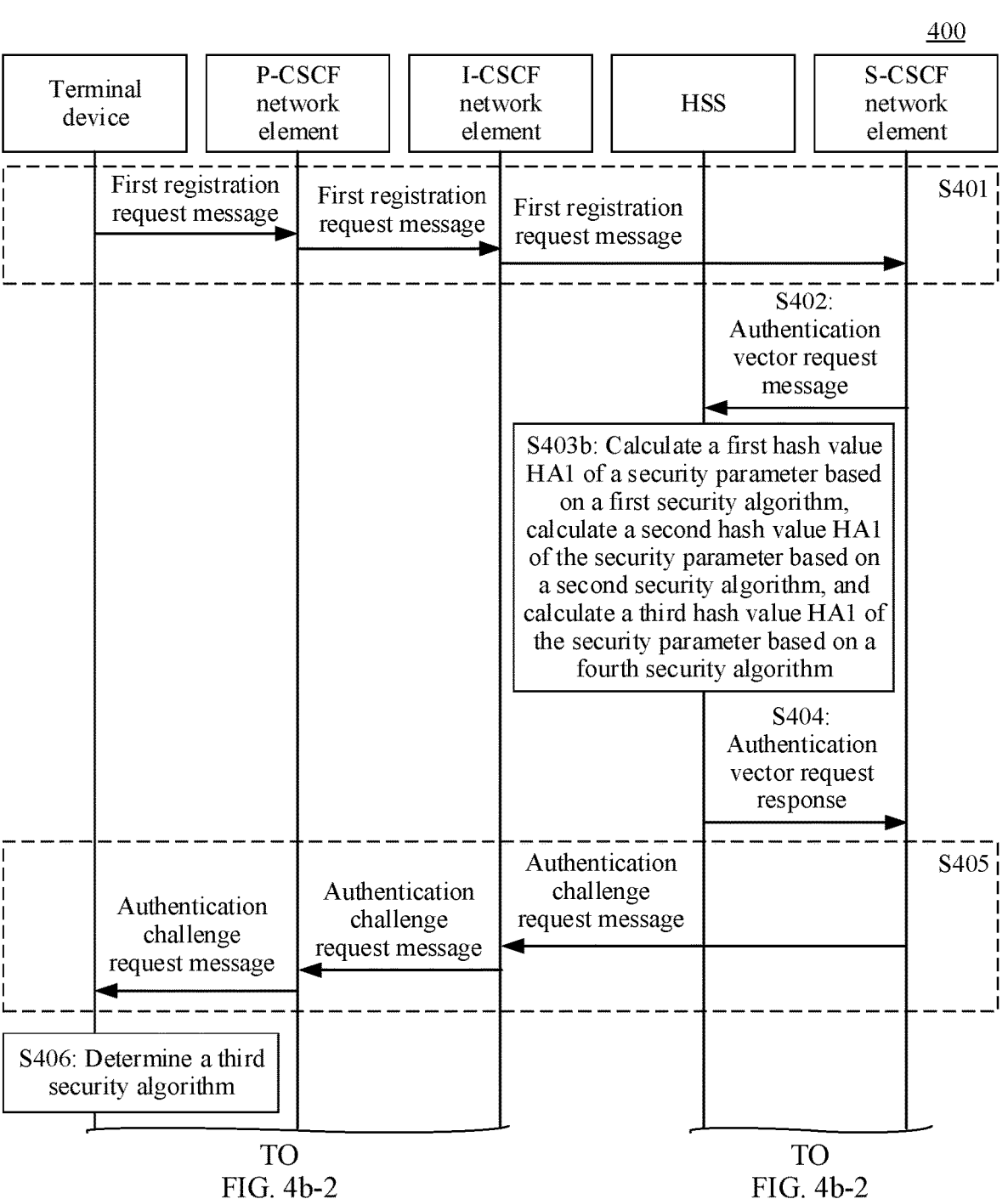
Figures 2, 4B:
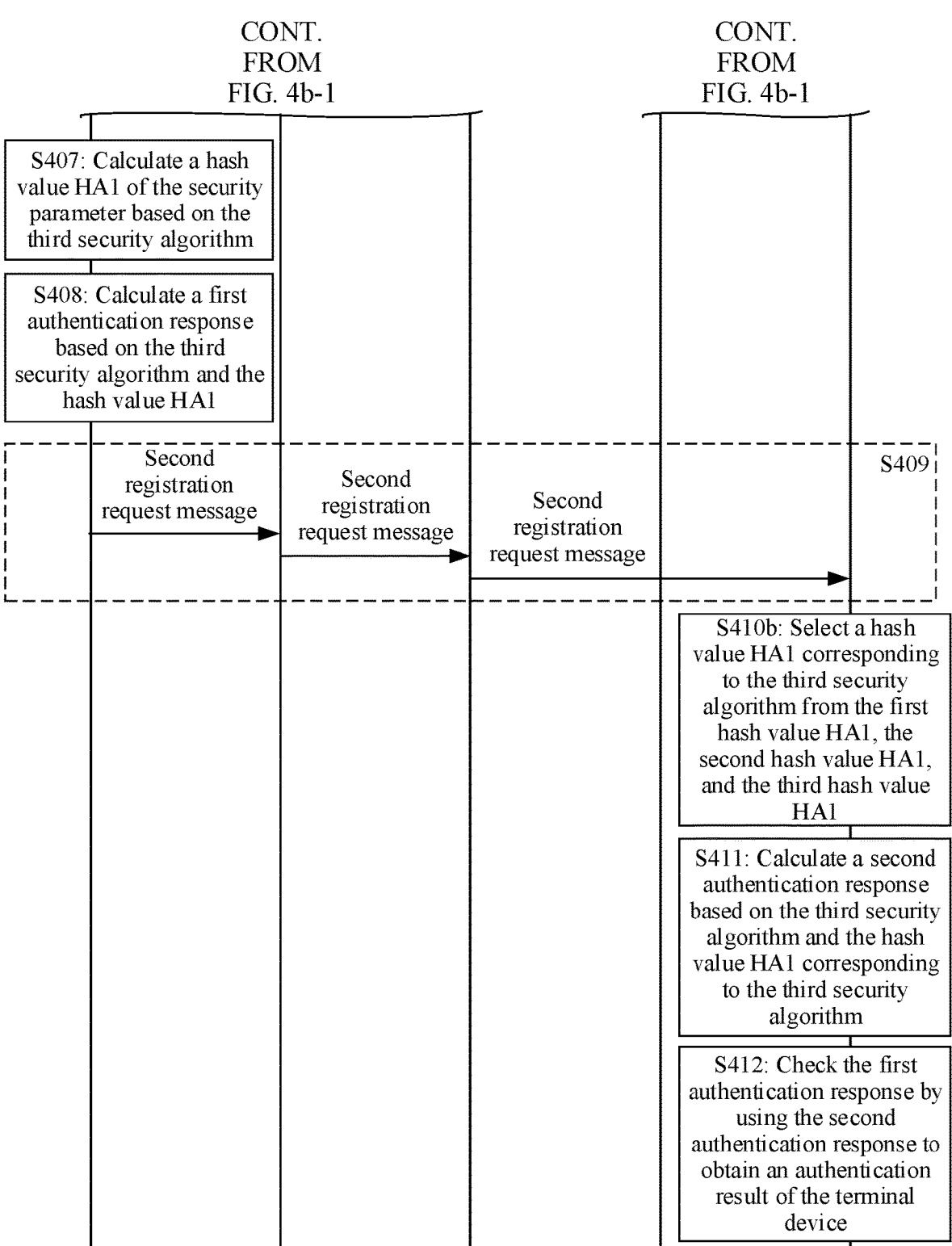

In a second case, when the HSS configures a first security algorithm, a second security algorithm, and a fourth security algorithm, the HSS performs S403*b* shown in FIG. 4*b*-1.

S403*b*: The HSS calculates a first hash value HA1 of a security parameter based on the first security algorithm, calculates a second hash value HA1 of the security parameter based on the second security algorithm, and calculates a third hash value HA1 of the security parameter based on the fourth security algorithm.

The first security algorithm is a SHA256, the second security algorithm is a SHA512, and the fourth security algorithm is an MD5 algorithm.

For a process of calculating the first hash value HA1 and the second hash value HA1, refer to S403*a*. For a process of calculating the third hash value HA1, refer to related descriptions in S122. Details are not described herein again.

S404: The HSS sends an authentication vector request response to the S-CSCF network element. Correspondingly, the S-CSCF network element receives the authentication vector request response from the HSS.

The authentication vector request response is described in two cases:

In a first case, when the HSS performs S403*a*, the authentication vector request response carries the first hash value HA1 and the second hash value HA1. The first hash value HA1 is the first hash value HA1 calculated by the HSS in S403*a*, and the second hash value HA1 is the second hash value HA1 calculated by the HSS in S403*a*. Certainly, the authentication vector request response may further include another parameter. For details, refer to related descriptions of S122. Details are not described herein again.

In some implementations, for example, the authentication vector request response carries two hash values, and the authentication vector request response carries the first hash value HA1 and the second hash value HA1 in a preset order. The preset order is determined based on a priority of the first security algorithm and a priority of the second security algorithm. For example, when the priority of the first security algorithm is higher than the priority of the second security algorithm, the first hash value HA1 is located before the second hash value HA1 in the authentication vector request response. On the contrary, when the priority of the first security algorithm is lower than the priority of the second security algorithm, the first hash value HA1 is located after the second hash value HA1 in the authentication vector request response. In this way, the S-CSCF network element can distinguish between the first hash value HA1 and the second hash value HA1 based on the preset order.

It should be noted that, the foregoing preset order is described by using only an indicator of "a priority of an algorithm" as an example. Certainly, the preset order may alternatively be determined based on another indicator. This is not limited in this embodiment of this application.

In some implementations, for example, the authentication vector request response carries two hash values, and the authentication vector request response further carries information about the first security algorithm and information about the second security algorithm. There is a correspondence between the information about the first security algorithm and the first hash value HA1, and there is a correspondence between the information about the second security algorithm and the second hash value HA1. For example, the first security algorithm is still the SHA256, and the second security algorithm is still the SHA512, the authentication vector request response further carries an identifier of the SHA256 and an identifier of the SHA512. The correspondence between the information about the first security algorithm and the first hash value HA1 may be reflected as a location relationship between the identifier of the SHA256 and the first hash value HA1 in the authentication vector request response. For example, the identifier of the SHA256 is located after (or before) the first hash value HA1. The correspondence between the information about the second security algorithm and the second hash value HA1 may be reflected as a location relationship between the identifier of the SHA512 and the second hash value HA1 in the authentication vector request response. For example, the identifier of the SHA512 is located after (or before) the second hash value HA1. Because the S-CSCF network element can distinguish between the first security algorithm and the second security algorithm based on information about security algorithms, the S-CSCF network element can distinguish between the first hash value HA1 and the second hash value HA2 with reference to the foregoing correspondences.

In a second case, when the HSS performs S403b, the authentication vector request response carries the first hash value HA1, the second hash value HA1, and the third hash value HA1. The first hash value HA1 is the first hash value HA1 calculated by the HSS in S403b, and the second hash value HA1 is the second hash value HA1 calculated by the HSS in S403b. The third hash value HA1 is the third hash value HA1 calculated by the HSS in S403b. Certainly, the authentication vector request response may further include another parameter. For details, refer to related descriptions of S122. Details are not described herein again.

In some implementations, for example, the authentication vector request response carries three hash values, and the authentication vector request response carries the first hash value HA1, the second hash value HA1, and the third hash value HA1 in a preset order. The preset order is determined based on a priority of the first security algorithm, a priority of the second security algorithm, and a priority of the fourth security algorithm.

In some implementations, for example, the authentication vector request response carries three hash values, and the authentication vector request response further carries information about the first security algorithm, information about the second security algorithm, and information about the fourth security algorithm. There is a correspondence between the information about the first security algorithm and the first hash value HA1, there is a correspondence between the information about the second security algorithm and the second hash value HA1, and there is a correspondence between the information about the fourth security algorithm and the third hash value HA1.

S405: The S-CSCF network element sends an authentication challenge request message to the terminal device. Correspondingly, the terminal device receives the authentication challenge request message from the S-CSCF network element.

For an implementation process of S405, refer to related descriptions of S131, S132, and S133. Details are not described herein again. The following describes the authentication challenge request message in two cases:

In a first case, for example, the authentication vector request response carries two hash values, and the authentication challenge request message carries the information about the first security algorithm and the information about the second security algorithm. The first security algorithm in the authentication challenge request message is consistent with the security algorithm for calculating the first hash value HA1 in the first case of S404. The second security algorithm in the authentication challenge request message is consistent with the security algorithm for calculating the second hash value HA1 in the first case of S404. Certainly, the authentication challenge request message may further include another parameter. For details, refer to related descriptions of S131. Details are not described herein again.

In some implementations, the authentication challenge request message carries the information about the first security algorithm and the information about the second security algorithm in a preset order. The preset order is determined based on a priority of the first security algorithm and a priority of the second security algorithm. For example, when the priority of the first security algorithm is higher than the priority of the second security algorithm, the information about the first security algorithm is located before the information about the second security algorithm in the authentication challenge request message. On the contrary, when the priority of the first security algorithm is lower than the priority of the second security algorithm, the information about the first security algorithm is located after the information about the second security algorithm in the authentication challenge request message. In this way, the terminal device can preferentially identify a security algorithm with a higher priority based on the preset order.

In a second case, for example, the authentication vector request response carries three hash values, and the authentication challenge request message carries information about the first security algorithm, information about the second security algorithm, and information about the fourth security algorithm. The first security algorithm in the authentication challenge request message is consistent with the security algorithm for calculating the first hash value HA1 in the second case of S404. The second security algorithm in the authentication challenge request message is consistent with the security algorithm for calculating the second hash value HA1 in the second case of S404. The fourth security algorithm in the authentication challenge request message is consistent with the security algorithm for calculating the third hash value HA1 in the second case of S404. Certainly, the authentication challenge request message may further include another parameter. For details, refer to related descriptions of S131. Details are not described herein again.

In some implementations, the authentication challenge request message carries the information about the first security algorithm, the information about the second security algorithm, and the information about the fourth security algorithm in a preset order. The preset order is determined based on a priority of the first security algorithm, a priority of the second security algorithm, and a priority of the fourth security algorithm, so that the terminal device preferentially identifies a security algorithm with a higher priority based on the preset order.

It should be noted that, the foregoing preset order is described by using only an indicator of "a priority of an algorithm" as an example. Certainly, the preset order may alternatively be determined based on another indicator. This is not limited in this embodiment of this application.

S406: The terminal device determines the third security algorithm.

An implementation process of S406 may be but is not limited to the following two cases:

In a first case, when "the authentication challenge request message carries information about two security algorithms (for example, the information about the first security algorithm and the information about the second security algorithm)", the third security algorithm is the first security algorithm, or the third security algorithm is the second security algorithm. An implementation process of S406 may be but is not limited to the following two manners:

In a first manner, the terminal device first determines the first security algorithm and the second security algorithm based on the authentication challenge request message. Then, the terminal device selects a security algorithm with a higher priority from the first security algorithm and the second security algorithm as the third security algorithm based on the priority of the first security algorithm and the priority of the second security algorithm.

In a second manner, when "the authentication challenge request message carries the information about the first security algorithm and the information about the second security algorithm in the preset order", the terminal device identifies information about security algorithms in the authentication challenge request message one by one, until the terminal device identifies information about a security algorithm supported by the terminal device. In this case, the security algorithm identified by the terminal device is the third security algorithm. In other words, the third security algorithm is a Pt security algorithm that is supported by the terminal device and that is in the preset order. For example, the authentication challenge request message carries an identifier of the SHA256 (that is, the information about the first security algorithm) and an identifier of the MD5 (that is, the information about the second security algorithm) in a preset order. When the terminal device supports the SHA256, and after the terminal device identifies information that is about the SHA256 and that is in the authentication challenge request message, the terminal device uses the SHA256 as the third security algorithm.

In a second case, when "the authentication challenge request message carries information about three security algorithms (for example, the information about the first security algorithm, the information about the second security algorithm, and the information about the fourth security algorithm)", the third security algorithm is the first security algorithm, the third security algorithm is the second security algorithm, or the third security algorithm is the fourth security algorithm. An implementation process of S406 may be but is not limited to the following two manners:

In a first manner, the terminal device first determines the first security algorithm, the second security algorithm, and the fourth security algorithm based on the authentication challenge request message. Then, the terminal device selects a security algorithm with a higher priority from the first security algorithm, the second security algorithm, and the fourth security algorithm based on the priority of the first security algorithm, the priority of the second security algorithm, and the priority of the fourth security algorithm as the third security algorithm.

In a second manner, when "the authentication challenge request message carries the information about the first security algorithm, the information about the second security algorithm, and the information about the fourth security algorithm in the preset order", the terminal device identifies information about security algorithms in the authentication challenge request message one by one, until identifies information about a security algorithm supported by the terminal device. In this case, the security algorithm identified by the terminal device is the third security algorithm.

S407: The terminal device calculates a hash value HA1 of the security parameter based on the third security algorithm.

The third security algorithm is the security algorithm determined by the terminal device in S406. For example, the third security algorithm is the SHA256.

The security parameter is a configuration parameter of the terminal device. The security parameter includes username, password, and realm information for logging in to the terminal device.

For example, the terminal device calculates the three parameters: username, password, and realm information by using the SHA256 (that is, the third security algorithm), to obtain an HA1 corresponding to the SHA256 (that is, the third security algorithm).

S408: The terminal device calculates a first authentication response based on the third security algorithm and the hash value HA1.

For example, the third security algorithm is still the SHA256, a calculation process of the first authentication response is as follows:

First, the terminal device calculates method and digest-uri by using the SHA256, to obtain a hash value HA2. For example, the hash value HA2 is a hash value obtained by combining the following parameters:

HA2=method:SHA256 value of digest-uri.

method indicates an HTTP request method, digest-uri indicates information about a URI, and ":" indicates combination.

Then, the terminal device calculates HA1, nonce, n-c, cnonce, qop, and HA2 by using the SHA256, to obtain the first authentication response. The first authentication response is a hash value obtained by combining the following parameters:

response=HA1:nonce:n-c:cnonce:qop:SHA256 value of HA2.

response indicates the first authentication response, HA1 indicates a hash value obtained by performing SHA256 calculation on username, realm information, and password, nonce indicates a random number generated by the S-CSCF network element, n-c indicates nonce-count, that is, a count value of a counter used by the terminal device to send a second registration request message by using a same nonce, cnonce is a random number generated by the terminal device, and a value of qop indicates that the first authentication response is used for only authentication or for both authentication and message body integrity protection. The hash value HA2 is a hash value obtained by combining method and digest-uri by using the SHA256 algorithm.

HA2=method:SHA256 value of digest-uri.

method indicates an HTTP request method, digest-uri indicates information about a URI, and ":" indicates combination.

S409: The terminal device sends the second registration request message to the S-CSCF network element. Correspondingly, the S-CSCF network element receives the second registration request message from the terminal device.

The second registration request message includes the first authentication response and the information about the third security algorithm. The first authentication response carried in the second registration request message is the first authentication response obtained by the terminal device through calculation in S408. The third security algorithm is the third security algorithm determined by the terminal device in S407. Certainly, the second registration request message may further include another parameter. For details, refer to related descriptions of S141. Details are not described herein again.

For an implementation process of S409, refer to related descriptions of S141, S142, and S143. Details are not described herein again.

For the S-CSCF network element, an execution process of the S-CSCF network element is described in the following two cases:

In a first case, when the authentication vector request response in S404 carries two hash values, the S-CSCF network element performs S410a shown in FIG. 4a-2.

S410a: The S-CSCF network element selects, from the first hash value HA1 and the second hash value HA1, a hash value HA1 corresponding to the third security algorithm.

The first hash value HA1 and the second hash value HA1 are hash values carried in the authentication vector request response in S404. The third security algorithm is a security algorithm determined by the S-CSCF network element based on the second registration request message in S409.

An implementation process of S410a may be but is not limited to the following two manners:

In a first manner, when "the authentication vector request response carries the first hash value HA1 and the second hash value HA1 in the preset order", the S-CSCF network element distinguishes between the first hash value HA1 and the second hash value HA1 based on the preset order. The S-CSCF network element selects, from the first hash value HA1 and the second hash value HA1, the hash value HA1 corresponding to the third security algorithm. Specifically, if the third security algorithm is implemented as the first security algorithm, the S-CSCF network element determines that a hash value corresponding to the third security algorithm is the first hash value HA1. If the third security algorithm is implemented as the second security algorithm, the S-CSCF network element determines that a hash value corresponding to the third security algorithm is the second hash value HA1.

In a second manner, when "the authentication vector request response further carries the information about the first security algorithm and the information about the second security algorithm, there is a correspondence between the information about the first security algorithm and the first hash value HA1, and there is a correspondence between the information about the second security algorithm and the second hash value HA1", the S-CSCF network element selects, based on correspondences in the authentication vector request response, the hash value HA1 corresponding to the third security algorithm from the first hash value HA1 and the second hash value HA1. Specifically, because the S-CSCF network element can distinguish between the first security algorithm and the second security algorithm based on information about security algorithms, the S-CSCF network element can distinguish between the first hash value HA1 and the second hash value HA1 with reference to the foregoing correspondences. If the third security algorithm is implemented as the first security algorithm, the S-CSCF network element determines that a hash value corresponding to the third security algorithm is the first hash value HA1. If the third security algorithm is implemented as the second security algorithm, the S-CSCF network element determines that a hash value corresponding to the third security algorithm is the second hash value HA1.

In a second case, when the authentication vector request response in S404 carries three hash values, the S-CSCF network element performs S410b shown in FIG. 4b-2.

S410b: The S-CSCF network element selects, from the first hash value HA1, the second hash value HA1, and the third hash value HA1, a hash value HA1 corresponding to the third security algorithm.

The first hash value HA1, the second hash value HA1, and the third hash value HA1 are hash values carried in the authentication vector request response in S404. The third security algorithm is a security algorithm determined by the S-CSCF network element based on the second registration request message in S409.

An implementation process of S410b may be but is not limited to the following two manners:

In a first manner, when "the authentication vector request response carries the first hash value HA1, the second hash value HA1, and the third hash value HA1 in the preset order", the S-CSCF network element distinguishes the first hash value HA1, the second hash value HA1, and the third hash value HA1 based on the preset order. The S-CSCF network element selects, from the first hash value HA1, the second hash value HA1, and the third hash value HA1, the hash value HA1 corresponding to the third security algorithm. For details, refer to descriptions of S410a. Details are not described herein again.

In a second manner, when "the authentication vector request response further carries the information about the first security algorithm, the information about the second security algorithm, and the information about the fourth security algorithm, there is a correspondence between the information about the first security algorithm and the first hash value HA1, there is a correspondence between the information about the second security algorithm and the second hash value HA1, and there is a correspondence between the information about the fourth security algorithm and the third hash value HA1", the S-CSCF network element selects, based on correspondences in the authentication vector request response, the hash value HA1 corresponding to the third security algorithm from the first hash value HA1 and the second hash value HA1. For details, refer to descriptions of S410a. Details are not described herein again.

S411: The S-CSCF network element calculates a second authentication response based on the third security algorithm and the hash value HA1 corresponding to the third security algorithm.

The third security algorithm is a security algorithm determined by the S-CSCF network element based on the second registration request message in S409, and is consistent with the third security algorithm in the second registration request message. The hash value HA1 corresponding to the third security algorithm is a hash value determined by the S-CSCF network element based on S410.

For example, the third security algorithm is the SHA256, a calculation process of the second authentication response is as follows:

First, the S-CSCF network element calculates method and digest-uri by using the SHA256, to obtain a hash value HA2.

Then, the S-CSCF network element calculates HAL nonce, n-c, cnonce, qop, and HA2 by using the SHA256, to obtain the second authentication response.

S412: The S-CSCF network element checks the first authentication response by using the second authentication response, to obtain an authentication result of the terminal device.

The first authentication response is the first authentication response carried in the second registration request message in S409. The second authentication response is the second authentication response obtained by the S-CSCF network element through calculation in S411.

For example, when the S-CSCF network element determines that the first authentication response is different from the second authentication response, the S-CSCF network element determines that authentication on the terminal device fails. On the contrary, when the S-CSCF network element determines that the first authentication response is the same as the second authentication response, the S-CSCF network element determines that authentication on the terminal device succeeds, and the S-CSCF network element sends an authentication success message to the terminal device. For details, refer to related descriptions of S151, S152, and S153. Details are not described herein again.

In other words, the terminal device can determine a security algorithm, that is, the third security algorithm, with reference to information about security algorithms in the authentication challenge request message and the security algorithm supported by the terminal device, and the terminal device calculates the first authentication response by using the third security algorithm. In addition, the terminal device adds the information about the third security algorithm to the second registration request message, to indicate, to the S-CSCF network element, the security algorithm supported by the terminal device. The terminal device and the S-CSCF network element may calculate an authentication response based on a same security algorithm, and the S-CSCF network element checks the first authentication response by using the second authentication response, to authenticate the terminal device. This prevents an authentication failure caused by using different security algorithms by the terminal device and the S-CSCF network element. For a network side (such as the S-CSCF network element and the HSS), the network side does not need to identify whether the terminal device supports a new security algorithm, and the network side only needs to use the method shown in FIG. 4*a*-1, FIG. 4*a*-2, FIG. 4*b*-1, or FIG. 4*b*-2. This simplifies an implementation process on the network side.

Figure 5A:
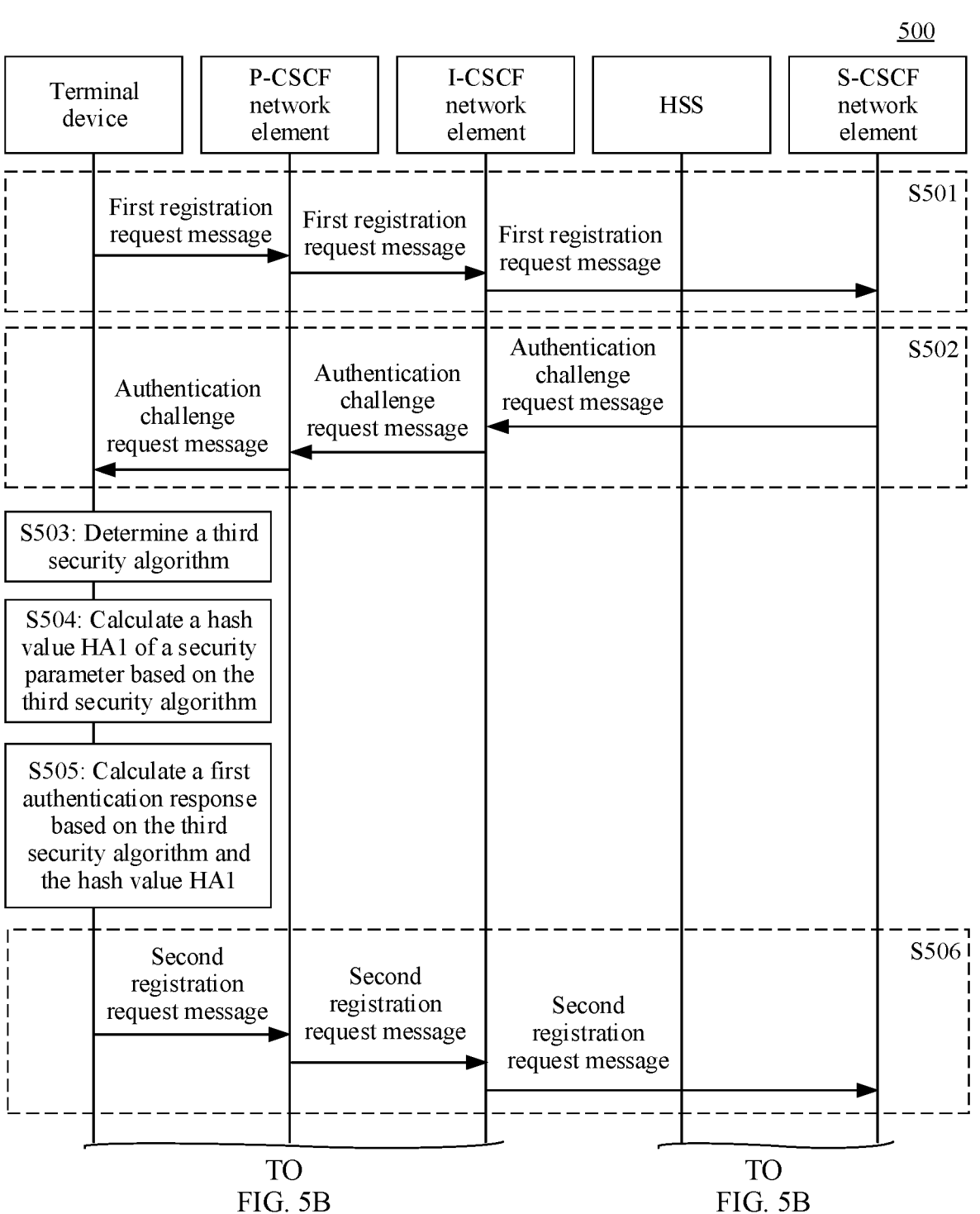
FIG. 5A and FIG. 5B are a schematic flowchart of still another authentication method according to an embodiment of this application.
Figure 5B:
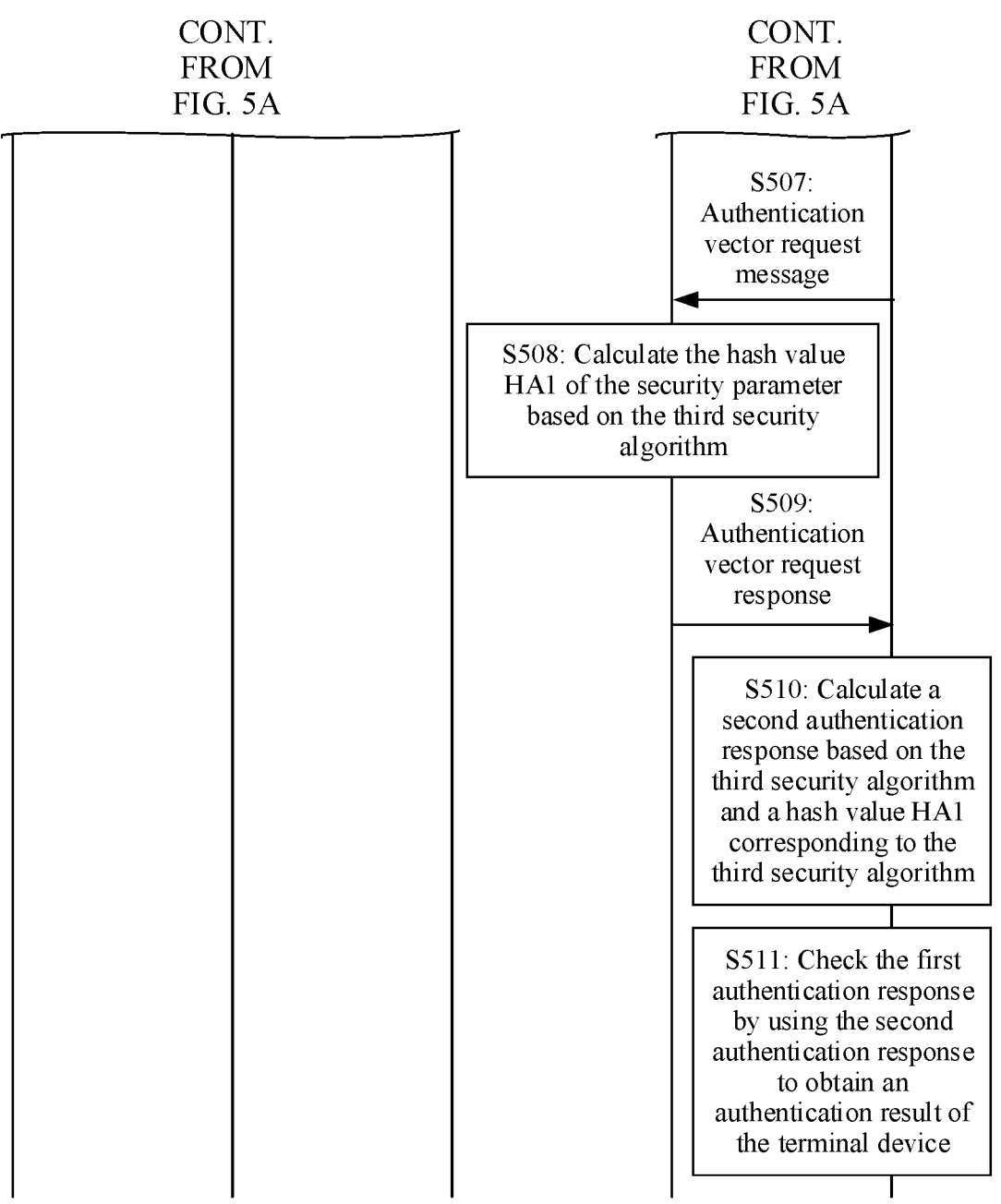

An embodiment of this application provides an authentication method 500. The authentication method 500 is applied to an authentication process. Refer to FIG. 5A and FIG. 5B. The authentication method 500 includes the following steps.

S501: A terminal device sends a first registration request message to an S-CSCF network element. Correspondingly, the S-CSCF network element receives the first registration request message from the terminal device.

For descriptions of the first registration request message, refer to related descriptions of the "first registration request message" in S111. Details are not described herein again. For an implementation process of S501, refer to related descriptions of S111, S112, and S113. Details are not described herein again.

S502: The S-CSCF network element sends an authentication challenge request message to the terminal device. Correspondingly, the terminal device receives the authentication challenge request message from the S-CSCF network element.

For an implementation process of S502, refer to related descriptions of S131, S132, and S133. Details are not described herein again.

The authentication challenge request message is described in two cases:

In a first case, the authentication challenge request message carries two security algorithms, that is, information about a first security algorithm and information about a second security algorithm. The first security algorithm is a SHA256, and the second security algorithm is an MD5 algorithm. Alternatively, the first security algorithm is a SHA512, and the second security algorithm is an MD5 algorithm. Alternatively, the first security algorithm is a SHA256, and the second security algorithm is a SHA512. Certainly, the authentication challenge request message may further include another parameter. For details, refer to related descriptions of S131. Details are not described herein again. In some implementations, the authentication challenge request message carries the information about the first security algorithm and the information about the second security algorithm in a preset order. For details, refer to descriptions of the first case of S405 in the method 400. Details are not described herein again.

In a second case, the authentication challenge request message carries three security algorithms, that is, information about the first security algorithm, information about the second security algorithm, and information about a fourth security algorithm. For example, the first security algorithm is a SHA256, the second security algorithm is a SHA512, and the fourth security algorithm is an MD5 algorithm. In some implementations, the authentication challenge request message carries the information about the first security algorithm, the information about the second security algorithm, and the information about the fourth security algorithm in a preset order. For details, refer to descriptions of the second case of S405 in the method 400. Details are not described herein again.

S503: The terminal device determines a third security algorithm.

An implementation process of S503 may be but is not limited to the following two cases:

In a first case, when "the authentication challenge request message carries information about two security algorithms (for example, the information about the first security algorithm and the information about the second security algorithm)", the third security algorithm is the first security algorithm, or the third security algorithm is the second security algorithm. For a specific implementation process of S503, refer to descriptions of the first case in S406. Details are not described herein again.

In a second case, when "the authentication challenge request message carries information about three security algorithms (for example, the information about the first security algorithm, the information about the second security algorithm, and the information about the fourth security algorithm)", the third security algorithm is the first security algorithm, the third security algorithm is the second security algorithm, or the third security algorithm is the fourth security algorithm. For a specific implementation process of S503, refer to descriptions of the first case in S406. Details are not described herein again.

S504: The terminal device calculates a hash value HA1 of a security parameter based on the third security algorithm.

The third security algorithm is the security algorithm determined by the terminal device in S503. For example, the third security algorithm is the SHA256.

The security parameter is a configuration parameter of the terminal device. The security parameter includes username, password, and realm information for logging in to the terminal device.

For example, the terminal device calculates the three parameters: username, password, and realm information by using the SHA256 (that is, the third security algorithm), to obtain an HA1 corresponding to the SHA256 (that is, the third security algorithm).

S505: The terminal device calculates a first authentication response based on the third security algorithm and the hash value HA1.

For example, the third security algorithm is still the SHA256, a calculation process of the first authentication response is as follows:

First, the terminal device calculates method and digest-uri by using the SHA256, to obtain a hash value HA2.

Then, the terminal device calculates HA1, nonce, n-c, cnonce, qop, and HA2 by using the SHA256, to obtain the first authentication response.

S506: The terminal device sends a second registration request message to the S-CSCF network element. Correspondingly, the S-CSCF network element receives the second registration request message from the terminal device.

The second registration request message includes the first authentication response and information about the third security algorithm. The first authentication response carried in the second registration request message is the first authentication response obtained by the terminal device through calculation in S505. The third security algorithm is the third security algorithm determined by the terminal device in S503. Certainly, the second registration request message may further include another parameter. For details, refer to related descriptions of S141. Details are not described herein again.

For an implementation process of S506, refer to related descriptions of S141, S142, and S143. Details are not described herein again.

S507: The S-CSCF network element sends an authentication vector request message to an HSS. Correspondingly, the HSS receives the authentication vector request message from the S-CSCF network element.

The authentication vector request message includes the information about the third security algorithm. The third security algorithm is consistent with the third security algorithm in the second registration request message in S506.

For an implementation process of S507, refer to related descriptions of S121. Details are not described herein again.

S508: The HSS calculates the hash value HA1 of the security parameter based on a third security algorithm.

The third security algorithm is determined by the HSS based on the authentication vector request message in S507, and is consistent with the third security algorithm in the authentication vector request message.

The security parameter includes username, password, and realm information for logging in to the terminal device.

For example, when the third security algorithm is the SHA256, the HSS calculates the three parameters: username, password, and realm information by using the SHA256 (that is, the third security algorithm), to obtain a hash value HA1 corresponding to the SHA256 (that is, the third security algorithm).

S509: The HSS sends an authentication vector request response to the S-CSCF network element. Correspondingly, the S-CSCF network element receives the authentication vector request response from the HSS.

The authentication vector request response carries a hash value HA1. The hash value HA1 is the hash value HA1 obtained by the HSS through calculation in S508. Certainly, the authentication vector request response may further include another parameter. For details, refer to related descriptions of S122. Details are not described herein again.

S510: The S-CSCF network element calculates a second authentication response based on the third security algorithm and a hash value HA1 corresponding to the third security algorithm.

The third security algorithm is a security algorithm determined by the S-CSCF network element based on the second registration request message in S506, and is consistent with the third security algorithm in the second registration request message.

For example, the third security algorithm is the SHA256, a calculation process of the second authentication response is as follows:

First, the S-CSCF network element calculates method and digest-uri by using the SHA256, to obtain a hash value HA2.

Then, the S-CSCF network element calculates HA1, nonce, n-c, cnonce, qop, and HA2 by using the SHA256, to obtain the second authentication response.

S511: The S-CSCF network element checks the first authentication response by using the second authentication response, to obtain an authentication result of the terminal device.

The first authentication response is the first authentication response carried in the second registration request message in S509. The second authentication response is the second authentication response obtained by the S-CSCF network element through calculation in S510.

For example, when the S-CSCF network element determines that the first authentication response is different from the second authentication response, the S-CSCF network element determines that authentication on the terminal device fails. On the contrary, when the S-CSCF network element determines that the first authentication response is the same as the second authentication response, the S-CSCF network element determines that authentication on the terminal device succeeds, and the S-CSCF network element sends an authentication success message to the terminal device. For details, refer to related descriptions of S151, S152, and S153. Details are not described herein again.

In other words, the terminal device can determine a security algorithm, that is, the third security algorithm, with reference to information about security algorithms in the authentication challenge request message and the security algorithm supported by the terminal device, and the terminal device calculates the first authentication response by using the third security algorithm. In addition, the terminal device adds the information about the third security algorithm to the second registration request message, to indicate, to the S-CSCF network element, the security algorithm supported by the terminal device. The terminal device and the S-CSCF network element may calculate an authentication response based on a same security algorithm, and the S-CSCF network element checks the first authentication response by using the second authentication response, to authenticate the terminal device. This prevents an authentication failure caused by using different security algorithms by the terminal device and the S-CSCF network element. For an interaction process between the S-CSCF network element and the HSS, the authentication vector request message carries the security algorithm supported by the terminal device, that is, the third security algorithm. Therefore, the HSS can provide the S-CSCF network element with the hash value HA1 corresponding to the third security algorithm, so that the S-CSCF network element calculates the second authentication response based on the HA1 of the third security algorithm provided by the HSS network element. For a network side (such as the S-CSCF network element and the HSS), the network side does not need to identify whether the terminal device supports a new security algorithm, and the network side only needs to use the method shown in FIG. 5A and FIG. 5B. This simplifies an implementation process on the network side.

The foregoing mainly describes the solutions provided in embodiments of this application from a perspective of interaction between network elements. Correspondingly, embodiments of this application further provide a communication apparatus. The communication apparatus may be the network element in the foregoing method embodiments, an apparatus including the foregoing network element, or a component that can be used in the network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

An embodiment of this application provides a chip. The chip includes a logic circuit and an input/output interface. The input/output interface is configured to communicate with a module other than the chip, and the logic circuit is configured to perform operations other than receiving and sending operations on the terminal device in the foregoing method embodiments.

For example, the chip implements a function of the terminal device in FIG. 3A and FIG. 3B in the foregoing method embodiments. The input/output interface may be configured to perform S301, S305, and S308 on a terminal device side in embodiments of this application, and/or the input/output interface is further configured to perform other receiving and sending steps on the terminal device side in embodiments of this application. The logic circuit may be configured to perform S306 and S307 on the terminal device side in embodiments of this application, and/or the logic circuit is further configured to perform other processing steps on the terminal device side in embodiments of this application.

For another example, the chip implements a function of the terminal device in FIG. 4a-1 and FIG. 4a-2 (or FIG. 4b-1 and FIG. 4b-2) in the foregoing method embodiments. The input/output interface may be configured to perform S401, S405, and S409 on the terminal device side, and/or the input/output interface is further configured to perform other receiving and sending steps on the terminal device side in embodiments of this application. The logic circuit may be configured to perform S406, S407, and S408 on the terminal device side, and/or the logic circuit is further configured to perform other processing steps on the terminal device side in embodiments of this application.

For another example, the chip implements a function of the terminal device in FIG. 5A and FIG. 5B in the foregoing method embodiments. The input/output interface may be configured to perform S501, S502, and S506 on the terminal device side, and/or the input/output interface is further configured to perform other receiving and sending steps on the terminal device side in embodiments of this application. The logic circuit may be configured to perform S503, S504, and S505 on the terminal device side, and/or the logic circuit is further configured to perform other processing steps on the terminal device side in embodiments of this application.

For example, the chip implements a function of the serving call session control function network element in FIG. 3A and FIG. 3B in the foregoing method embodiments. The input/output interface may be configured to perform S301, S302, S304, S305, and S308 on a serving call session control function network element side in embodiments of this application, and/or the input/output interface is further configured to perform other receiving and sending steps on the serving call session control function network element side in embodiments of this application. The logic circuit may be configured to perform S309 and S310 on the serving call session control function network element side in embodiments of this application, and/or the logic circuit is further configured to perform other processing steps on the serving call session control function network element side in embodiments of this application.

For another example, the chip implements a function of the serving call session control function network element in FIG. 4a-1 and FIG. 4a-2 in the foregoing method embodiments. The input/output interface may be configured to perform S401, S402, S404, S405, and S409 on a serving call session control function network element side, and/or the input/output interface is further configured to perform other receiving and sending steps on the serving call session control function network element side in embodiments of this application. The logic circuit may be configured to perform S410a, S411, and S412, on the serving call session control function network element side, and/or the logic circuit is further configured to perform other processing steps on the serving call session control function network element side in embodiments of this application.

For another example, the chip implements a function of the serving call session control function network element in FIG. 4b-1 and FIG. 4b-2 in the foregoing method embodiments. The input/output interface may be configured to perform S401, S402, S404, S405, and S409 on a serving call session control function network element side, and/or the input/output interface is further configured to perform other receiving and sending steps on the serving call session control function network element side in embodiments of this application. The logic circuit may be configured to perform S410b, S411, and S412, on the serving call session control function network element side, and/or the logic circuit is further configured to perform other processing steps on the serving call session control function network element side in embodiments of this application.

For another example, the chip implements a function of the serving call session control function network element in FIG. 5A and FIG. 5B in the foregoing method embodiments. The input/output interface may be configured to perform S501, S502, S506, S507, and S509 on a serving call session control function network element side, and/or the input/output interface is further configured to perform other receiving and sending steps on the serving call session control function network element side in embodiments of this application. The logic circuit may be configured to perform S510 and S511 on the serving call session control function network element side, and/or the logic circuit is further configured to perform other processing steps on the serving call session control function network element side in embodiments of this application.

For example, the chip implements a function of the home subscriber server in FIG. 3A and FIG. 3B in the foregoing method embodiments. The input/output interface may be configured to perform S302 and S304 on a home subscriber server side in embodiments of this application, and/or the input/output interface is further configured to perform other receiving and sending steps on the home subscriber server side in embodiments of this application. The logic circuit may be configured to perform S303 on the home subscriber server side in embodiments of this application, and/or the logic circuit is further configured to perform other processing steps on the home subscriber server side in embodiments of this application.

For another example, the chip implements a function of the home subscriber server in FIG. 4a-1 and FIG. 4a-2 in the foregoing method embodiments. The input/output interface may be configured to perform S402 and S404 on a home subscriber server side, and/or the input/output interface is further configured to perform other receiving and sending steps on the home subscriber server side in embodiments of this application. The logic circuit may be configured to perform S403a on the home subscriber server side, and/or the logic circuit is further configured to perform other processing steps on the home subscriber server side in embodiments of this application.

For another example, the chip implements a function of the home subscriber server in FIG. 4b-1 and FIG. 4b-2 in the foregoing method embodiments. The input/output interface may be configured to perform S402 and S404 on a home subscriber server side, and/or the input/output interface is further configured to perform other receiving and sending steps on the home subscriber server side in embodiments of this application. The logic circuit may be configured to perform S403b on the home subscriber server side, and/or the logic circuit is further configured to perform other processing steps on the home subscriber server side in embodiments of this application.

For another example, the chip implements a function of the home subscriber server in FIG. 5A and FIG. 5B in the foregoing method embodiments. The input/output interface may be configured to perform S507 and S509 on a home subscriber server side, and/or the input/output interface is further configured to perform other receiving and sending steps on the home subscriber server side in embodiments of this application. The logic circuit may be configured to perform S508 on the home subscriber server side, and/or the logic circuit is further configured to perform other processing steps on the home subscriber server side in embodiments of this application.

Figure 6:
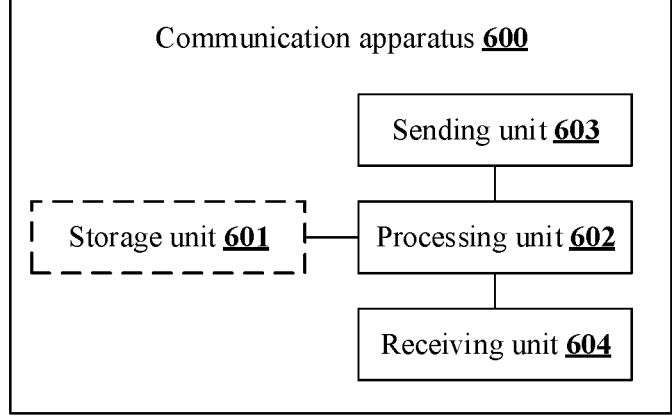
FIG. 6 is a schematic diagram of a structure of a communication apparatus according to an embodiment of this application.

FIG. 6 is a schematic diagram of a structure of a communication apparatus 600. The communication apparatus 600 may exist in a form of software, or may be a device or a component in the device.

The communication apparatus 600 includes a processing unit 602, a sending unit 603, and a receiving unit 604.

The sending unit 603 is an interface circuit of the communication apparatus 600, and is configured to send a signal to another apparatus. For example, when the communication apparatus 600 is implemented in a form of a chip, the sending unit 603 is an interface circuit used by the chip to send a signal to another chip or apparatus.

The receiving unit 604 is an interface circuit of the communication apparatus 600, and is configured to receive a signal from another apparatus. For example, when the communication apparatus 600 is implemented in a form of a chip, the receiving unit 604 is an interface circuit used by the chip to receive a signal from another chip or apparatus.

For example, when the communication apparatus 600 is configured to implement a function of the foregoing terminal device, for example, in FIG. 3A and FIG. 3B, the processing unit 602 may be configured to support the communication apparatus 600 in performing S306 and S307 in FIG. 3A and FIG. 3B, and/or configured to perform another process in the solution described in this specification. The sending unit 603 is configured to support communication between the communication apparatus 600 and another network element. For example, the sending unit 603 is configured to support the communication apparatus 600 in performing S301 and S308 in FIG. 3A and FIG. 3B, and/or configured to perform another process in the solution described in this specification. The receiving unit 604 is configured to support communication between the communication apparatus 600 and another network element. For example, the receiving unit 604 is configured to support the communication apparatus 600 in performing S305 in FIG. 3A, and/or configured to perform another process in the solution described in this specification.

FIG. 4a-1 and FIG. 4a-2 (or FIG. 4b-1 and FIG. 4b-2) are used as an example. The processing unit 602 may be configured to support the communication apparatus 600 in performing S406, S407, and S408 in FIG. 4a-1 and FIG. 4a-2 (or FIG. 4b-1 and FIG. 4b-2), and/or configured to perform another process in the solution described in this specification. The sending unit 603 is configured to support communication between the communication apparatus 600 and another network element. For example, the sending unit 603 is configured to support the communication apparatus 600 in performing S401 and S409 in FIG. 4a-1 and FIG. 4a-2 (or FIG. 4b-1 and FIG. 4b-2), and/or configured to perform another process in the solution described in this specification. The receiving unit 604 is configured to support communication between the communication apparatus 600 and another network element. For example, the receiving unit 604 is configured to support the communication apparatus 600 in performing S405 in FIG. 4a-1 (or FIG. 4b-1), and/or configured to perform another process in the solution described in this specification.

FIG. 5A and FIG. 5B are used as an example. The processing unit 602 may be configured to support the communication apparatus 600 in performing S503, S504, and S505 in FIG. 5A, and/or configured to perform another process in the solution described in this specification. The sending unit 603 is configured to support communication between the communication apparatus 600 and another network element. For example, the sending unit 603 is configured to support the communication apparatus 600 in performing S501 and S506 in FIG. 5A and FIG. 5B, and/or configured to perform another process in the solution described in this specification. The receiving unit 604 is configured to support communication between the communication apparatus 600 and another network element. For example, the receiving unit 604 is configured to support the communication apparatus 600 in performing S502 in FIG. 5A, and/or configured to perform another process in the solution described in this specification.

For example, when the communication apparatus 600 is configured to implement a function of the foregoing serving call session control function network element, for example, in FIG. 3A and FIG. 3B, the processing unit 602 may be configured to support the communication apparatus 600 in performing S309 and S310 in FIG. 3B, and/or configured to perform another process in the solution described in this specification. The sending unit 603 is configured to support communication between the communication apparatus 600 and another network element. For example, the sending unit 603 is configured to support the communication apparatus 600 in performing S302 in FIG. 3A, and/or configured to perform another process in the solution described in this specification. The receiving unit 604 is configured to support communication between the communication apparatus 600 and another network element. For example, the receiving unit 604 is configured to support the communication apparatus 600 in performing S301, S304, and S308 in FIG. 3A and FIG. 3B, and/or configured to perform another process in the solution described in this specification.

FIG. 4a-1 and FIG. 4a-2 are used as an example. The processing unit 602 may be configured to support the communication apparatus 600 in performing S410a, S411, and S412 in FIG. 4a-2, and/or configured to perform another process in the solution described in this specification. The sending unit 603 is configured to support communication between the communication apparatus 600 and another network element. For example, the sending unit 603 is configured to support the communication apparatus 600 in performing S402 in FIG. 4*a*-1, and/or configured to perform another process in the solution described in this specification. The receiving unit 604 is configured to support communication between the communication apparatus 600 and another network element. For example, the receiving unit 604 is configured to support the communication apparatus 600 in performing S401, S404, and S409 in FIG. 4*a*-1 and FIG. 4*a*-2, and/or configured to perform another process in the solution described in this specification.

FIG. 4*b*-1 and FIG. 4*b*-2 are used as an example. The processing unit 602 may be configured to support the communication apparatus 600 in performing S410*b*, S411, and S412 in FIG. 4*b*-2, and/or configured to perform another process in the solution described in this specification. The sending unit 603 is configured to support communication between the communication apparatus 600 and another network element. For example, the sending unit 603 is configured to support the communication apparatus 600 in performing S402 in FIG. 4*b*-1, and/or configured to perform another process in the solution described in this specification. The receiving unit 604 is configured to support communication between the communication apparatus 600 and another network element. For example, the receiving unit 604 is configured to support the communication apparatus 600 in performing S401, S404, and S409 in FIG. 4*b*-1 and FIG. 4*b*-2, and/or configured to perform another process in the solution described in this specification.

FIG. 5A and FIG. 5B are used as an example. The processing unit 602 may be configured to support communication apparatus 600 in performing S510 and S511 in FIG. 5B, and/or configured to perform another process in the solution described in this specification. The sending unit 603 is configured to support communication between the communication apparatus 600 and another network element. For example, the sending unit 603 is configured to support the communication apparatus 600 in performing S502 and S507 in FIG. 5A and FIG. 5B, and/or configured to perform another process in the solution described in this specification. The receiving unit 604 is configured to support communication between the communication apparatus 600 and another network element. For example, the receiving unit 604 is configured to support the communication apparatus 600 in performing S501, S506, and S509 in FIG. 5A and FIG. 5B, and/or configured to perform another process in the solution described in this specification.

For example, when the communication apparatus 600 is configured to implement a function of the foregoing home subscriber server, for example, in FIG. 3A and FIG. 3B, the processing unit 602 may be configured to support the communication apparatus 600 in performing S303 in FIG. 3A, and/or configured to perform another process in the solution described in this specification. The sending unit 603 is configured to support communication between the communication apparatus 600 and another network element. For example, the sending unit 603 is configured to support the communication apparatus 600 in performing S304 in FIG. 3A, and/or configured to perform another process in the solution described in this specification. The receiving unit 604 is configured to support communication between the communication apparatus 600 and another network element. For example, the receiving unit 604 is configured to support the communication apparatus 600 in performing S302 in FIG. 3A, and/or configured to perform another process in the solution described in this specification.

FIG. 4*a*-1 and FIG. 4*a*-2 are used as an example. The processing unit 602 may be configured to support the communication apparatus 600 in performing S403*a* in FIG. 4*a*-1, and/or configured to perform another process in the solution described in this specification. The sending unit 603 is configured to support communication between the communication apparatus 600 and another network element. For example, the sending unit 603 is configured to support the communication apparatus 600 in performing S404 in FIG. 4*a*-1, and/or configured to perform another process in the solution described in this specification. The receiving unit 604 is configured to support communication between the communication apparatus 600 and another network element. For example, the receiving unit 604 is configured to support the communication apparatus 600 in performing S402 in FIG. 4*a*-1, and/or configured to perform another process in the solution described in this specification.

FIG. 4*b*-1 and FIG. 4*b*-2 are used as an example. The processing unit 602 may be configured to support the communication apparatus 600 in performing S403*b* in FIG. 4*b*-1, and/or configured to perform another process in the solution described in this specification. The sending unit 603 is configured to support communication between the communication apparatus 600 and another network element. For example, the sending unit 603 is configured to support the communication apparatus 600 in performing S404 in FIG. 4*b*-1, and/or configured to perform another process in the solution described in this specification. The receiving unit 604 is configured to support communication between the communication apparatus 600 and another network element. For example, the receiving unit 604 is configured to support the communication apparatus 600 in performing S402 in FIG. 4*b*-1, and/or configured to perform another process in the solution described in this specification.

FIG. 5A and FIG. 5B are used as an example. The processing unit 602 may be configured to support the communication apparatus 600 in performing S508 in FIG. 5B, and/or configured to perform another process in the solution described in this specification. The sending unit 603 is configured to support communication between the communication apparatus 600 and another network element. For example, the sending unit 603 is configured to support the communication apparatus 600 in performing S509 in FIG. 5B, and/or configured to perform another process in the solution described in this specification. The receiving unit 604 is configured to support communication between the communication apparatus 600 and another network element. For example, the receiving unit 604 is configured to support the communication apparatus 600 in performing S507 in FIG. 5B, and/or configured to perform another process in the solution described in this specification.

Optionally, the communication apparatus 600 may further include a storage unit 601, configured to store program code and data of the communication apparatus 600. The data may include but is not limited to original data, intermediate data, or the like.

The processing unit 602 may be a processor or a controller, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing unit 602 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The sending unit 603 and the receiving unit 604 may be a communication interface, a transceiver, a transceiver circuit, or the like. The communication interface is a general term. During specific implementation, the communication interface may include a plurality of interfaces.

The storage unit 601 may be a memory.

Figure 7:
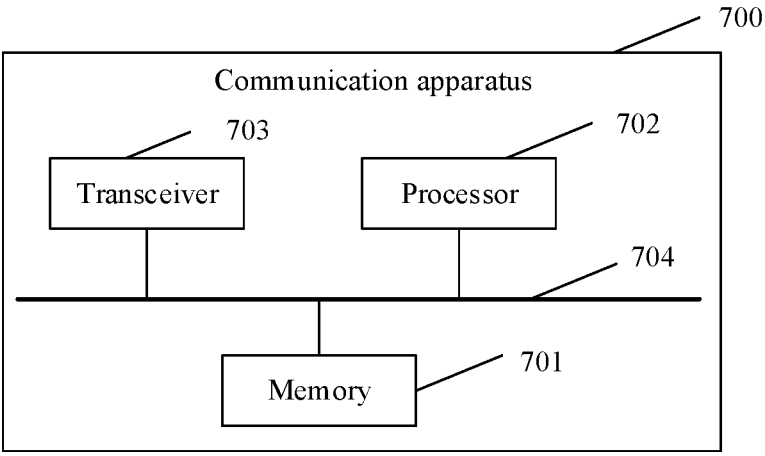
FIG. 7 is a schematic diagram of a structure of another communication apparatus according to an embodiment of this application.

When the processing unit 602 includes a processor, the sending unit 603 and the receiving unit 604 include a communication interface, and the storage unit 601 includes a memory, the communication apparatus 700 in this embodiment of this application may be shown in FIG. 7.

Refer to FIG. 7. The communication apparatus 700 includes at least one processor 702, a transceiver 703, and a memory 701.

The transceiver 703 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in this embodiment of this application.

Optionally, the communication apparatus 700 may further include a bus 704. The transceiver 703, the processor 702, and the memory 701 may be connected to each other through the bus 704. The bus 704 may include a peripheral component interconnect (peripheral component interconnect, PCI) bus, an extended industry standard architecture (extended industry standard architecture, EISA) bus, or the like. The bus 704 may be classified into an address bus, a data bus, a control bus, and the like. For ease of representation, only one bold line is used for representation in FIG. 7, but this does not mean that there is only one bus or only one type of bus.

A person of ordinary skill in the art may understand that all or some of the foregoing embodiments may be implemented by software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may include a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may include any usable medium that can be accessed by a computer, or may be a data storage device such as a server or a data center integrated with one or more usable media. The usable medium may include a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device. Some or all of the units may be selected based on actual requirements to achieve the objectives of the solutions of embodiments.

In addition, functional units in embodiments of this application may be integrated into one processing unit, each of the functional units may exist alone physically, or two or more units may be integrated into one unit. The integrated unit may be implemented as hardware, or may be implemented as a combination of hardware and a software functional unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions of this application or a part that contributes to the conventional technology may be implemented in a form of a software product. The computer software product is stored in a readable storage medium, for example, a floppy disk, a hard disk, or an optical disc of a computer, and includes several instructions for instructing a computer device (which may include a personal computer, a server, a network device, or the like) to perform the methods in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An authentication method, comprising:
   receiving a first registration request message from a terminal device;
   sending an authentication vector request message to a home subscriber server;
   receiving an authentication vector request response from the home subscriber server, wherein the authentication vector request response comprises a first hash value of a security parameter and a second hash value of the security parameter, the first hash value is calculated based on a first security algorithm, and the second hash value is calculated based on a second security algorithm;

sending an authentication challenge request message to the terminal device, wherein the authentication challenge request message comprises information about the first security algorithm and information about the second security algorithm;

receiving a second registration request message from the terminal device, wherein the second registration request message comprises a first authentication response and information about a third security algorithm, the first authentication response is calculated based on the third security algorithm, and the third security algorithm is the first security algorithm or the second security algorithm;

selecting, from the first hash value and the second hash value, a hash value corresponding to the third security algorithm;

calculating a second authentication response based on the third security algorithm and the hash value corresponding to the third security algorithm; and checking the first authentication response by using the second authentication response, to obtain an authentication result of the terminal device.

2. The method according to claim 1, wherein the first hash value and the second hash value are in the authentication vector request response in a preset order, and the preset order is determined based on a priority of the first security algorithm and a priority of the second security algorithm; and wherein selecting the hash value corresponding to the third security algorithm comprises:

selecting, based on the preset order of the first hash value and the second hash value, the hash value corresponding to the third security algorithm.

3. The method according to claim 1, wherein the information about the first security algorithm and the information about the second security algorithm are comprised in the authentication challenge request message in a preset order, and the preset order is determined based on a priority of the first security algorithm and a priority of the second security algorithm.

4. The method according to claim 1, wherein the first security algorithm is a secure hash algorithm (SHA)256 or a secure hash algorithm (SHA)512, and the second security algorithm is a message digest 5 algorithm.

5. A communication apparatus, comprising:

at least one processor; and one or more memories coupled to the at least one processor and storing programming instructions for execution by the at least one processor to:

receive a first registration request message from a terminal device;

send an authentication vector request message to a home subscriber server;

receive an authentication vector request response returned by the home subscriber server, wherein the authentication vector request response carries a first hash value of a security parameter and a second hash value of the security parameter, the first hash value is calculated based on a first security algorithm, and the second hash value is calculated based on a second security algorithm;

send an authentication challenge request message to the terminal device, wherein the authentication challenge request message carries information about the first security algorithm and information about the second security algorithm;

receive a second registration request message from the terminal device, wherein the second registration request message comprises a first authentication response and information about a third security algorithm, the first authentication response is calculated based on the third security algorithm, and the third security algorithm is the first security algorithm or the second security algorithm;

select, from the first hash value and the second hash value, a hash value corresponding to the third security algorithm;

calculate a second authentication response based on the third security algorithm and the hash value corresponding to the third security algorithm; and check the first authentication response by using the second authentication response, to obtain an authentication result of the terminal device.

6. The apparatus according to claim 5, wherein the information about the first security algorithm and the information about the second security algorithm are comprised in the authentication challenge request message in a preset order, and the preset order is determined based on the priority of the first security algorithm and the priority of the second security algorithm.

7. The apparatus according to claim 5, wherein the first security algorithm is a secure hash algorithm (SHA)256 or a secure hash algorithm (SHA)512, and the second security algorithm is a message digest 5 algorithm.

8. An authentication method, comprising:

receiving, by a serving call session control function network element, a first registration request message from a terminal device;

sending, by the serving call session control function network element, an authentication vector request message to a home subscriber server;

receiving, by the home subscriber server, the authentication vector request message;

calculating, by the home subscriber server, a first hash value of a security parameter based on a first security algorithm;

calculating, by the home subscriber server, a second hash value of the security parameter based on a second security algorithm;

sending, by the home subscriber server, an authentication vector request response to the serving call session control function network element, wherein the authentication vector request response comprises the first hash value and the second hash value;

receiving, by the serving call session control function network element, the authentication vector request response, sending, by the serving call session control function network element, an authentication challenge request message to the terminal device, wherein the authentication challenge request message comprises information about the first security algorithm and information about the second security algorithm;

receiving, by the serving call session control function network element, a second registration request message from the terminal device, wherein the second registration request message comprises a first authentication response and information about a third security algorithm, the first authentication response is calculated based on the third security algorithm, and the third security algorithm is the first security algorithm or the second security algorithm;

selecting, by the serving call session control function network element from the first hash value and the second hash value, a hash value corresponding to the third security algorithm;

calculating, by the serving call session control function network element, a second authentication response based on the third security algorithm and the hash value corresponding to the third security algorithm; and checking, by the serving call session control function network element, the first authentication response by using the second authentication response, to obtain an authentication result of the terminal device.

9. The method according to claim 8, wherein the information about the first security algorithm and the information about the second security algorithm are comprised in the authentication challenge request message in a preset order, and the preset order is determined based on a priority of the first security algorithm and a priority of the second security algorithm.

10. The method according to claim 8, wherein the first security algorithm is a secure hash algorithm (SHA)256 or a secure hash algorithm (SHA)512, and the second security algorithm is a message digest 5 algorithm.

11. The method according to claim 8, further comprising:

sending, by the terminal device, the first registration request message to a serving call session control function network element;

receiving, by the terminal device, the authentication challenge request message from the serving call session control function network element;

determining, by the terminal device, the third security algorithm;

calculating, by the terminal device, a hash value of the security parameter based on the third security algorithm;

calculating, by the terminal device, the first authentication response based on the third security algorithm and the hash value; and sending, by the terminal device, the second registration request message to the serving call session control function network element.

12. The method according to claim 11, wherein determining, by the terminal device, the third security algorithm comprises:

determining, by the terminal device, as the third security algorithm, a 1st security algorithm that is supported by the terminal device and that is in the authentication challenge request message.

13. A system, comprising: a serving call session control function network element and a home subscriber server, wherein the serving call session control function network element is configured to:

receive a first registration request message from a terminal device; and send an authentication vector request message to the home subscriber server;

wherein the home subscriber server is configured to:

receive the authentication vector request message;

calculate a first hash value of a security parameter based on a first security algorithm;

calculate a second hash value of the security parameter based on a second security algorithm; and send an authentication vector request response to the serving call session control function network element, wherein the authentication vector request response comprises the first hash value and the second hash value;

wherein the serving call session control function network element is further configured to:

receive the authentication vector request response, send an authentication challenge request message to the terminal device, wherein the authentication challenge request message comprises information about the first security algorithm and information about the second security algorithm;

receive a second registration request message from the terminal device, wherein the second registration request message comprises a first authentication response and information about a third security algorithm, the first authentication response is calculated based on the third security algorithm, and the third security algorithm is the first security algorithm or the second security algorithm;

select, from the first hash value and the second hash value, a hash value corresponding to the third security algorithm;

calculate a second authentication response based on the third security algorithm and the hash value corresponding to the third security algorithm; and check the first authentication response by using the second authentication response, to obtain an authentication result of the terminal device.

14. The system according to claim 13, wherein the information about the first security algorithm and the information about the second security algorithm are comprised in the authentication challenge request message in a preset order, and the preset order is determined based on a priority of the first security algorithm and a priority of the second security algorithm.

15. The system according to claim 13, wherein the first security algorithm is a secure hash algorithm (SHA)256 or a secure hash algorithm (SHA)512, and the second security algorithm is a message digest 5 algorithm.

16. The system according to claim 13, further comprising: the terminal device configured to:

send the first registration request message to a serving call session control function network element;

receive the authentication challenge request message from the serving call session control function network element;

determine the third security algorithm;

calculate a hash value of the security parameter based on the third security algorithm;

calculate the first authentication response based on the third security algorithm and the hash value; and send the second registration request message to the serving call session control function network element.

* * * * *